(12) United States Patent
Fuse

(10) Patent No.: US 8,941,887 B2
(45) Date of Patent: Jan. 27, 2015

(54) IMAGE PROCESSING APPARATUS AND IMAGE PROCESSING METHOD TO GENERATE HALFTONE IMAGE DATA BASED ON PREDICTION OF DENSITY CORRESPONDING TO RESOLUTION OF IMAGE TO BE PRINTED

(75) Inventor: Koji Fuse, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 13/355,326

(22) Filed: Jan. 20, 2012

(65) Prior Publication Data

US 2012/0188610 A1    Jul. 26, 2012

(30) Foreign Application Priority Data

Jan. 26, 2011   (JP) ................................. 2011-013915

(51) Int. Cl.
*H04N 1/405* (2006.01)
(52) U.S. Cl.
CPC ..................................... *H04N 1/405* (2013.01)
USPC .......................................... 358/3.3; 358/3.06
(58) Field of Classification Search
CPC .................................................. H04N 1/40018
See application file for complete search history.

(56) References Cited

U.S. PATENT DOCUMENTS

| 6,717,696 | B1 * | 4/2004 | Wang et al. ..................... 358/1.9 |
| 6,775,029 | B1 * | 8/2004 | Wen et al. ........................ 358/1.9 |
| 2012/0182587 | A1 * | 7/2012 | Shacham et al. .............. 358/3.06 |

FOREIGN PATENT DOCUMENTS

| JP | 7-333822 A | 12/1995 |
| JP | 2005-144873 A | 6/2005 |

* cited by examiner

*Primary Examiner* — Barbara Reinier
*Assistant Examiner* — Christopher D Wait
(74) *Attorney, Agent, or Firm* — Canon U.S.A., Inc. IP Division

(57) ABSTRACT

An image processing apparatus configured to convert input image data into halftone image data by halftone-processing the input image data includes a prediction unit configured to predict a density of a pixel of interest, which is achieved when the halftone image data is printed, based on a group of halftone-processed pixels neighboring the pixel of interest according to a prediction method determined according to a halftone-processed pixel value of the pixel of interest, and a control unit configured to control the halftone processing according to the density predicted by the prediction unit.

16 Claims, 17 Drawing Sheets

FIG.7

| 0 | 0 | 0 | 0 | 0 | 0 | 0 | 0 | 0 | 0 | 0 |
|---|---|---|---|---|---|---|---|---|---|---|
| 0 | 0 | 0 | 0.01 | 0.01 | 0.01 | 0.01 | 0.01 | 0 | 0 | 0 |
| 0 | 0 | 0.01 | 0.01 | 0.01 | 0.01 | 0.01 | 0.01 | 0.01 | 0 | 0 |
| 0 | 0.01 | 0.01 | 0.01 | 0.02 | 0.02 | 0.02 | 0.01 | 0.01 | 0.01 | 0 |
| 0 | 0.01 | 0.01 | 0.02 | 0.02 | 0.02 | 0.02 | 0.02 | 0.01 | 0.01 | 0 |
| 0 | 0.01 | 0.01 | 0.02 | 0.02 | 0.03 | 0.02 | 0.02 | 0.01 | 0.01 | 0 |
| 0 | 0.01 | 0.01 | 0.02 | 0.02 | 0.02 | 0.02 | 0.02 | 0.01 | 0.01 | 0 |
| 0 | 0.01 | 0.01 | 0.01 | 0.02 | 0.02 | 0.02 | 0.01 | 0.01 | 0.01 | 0 |
| 0 | 0 | 0.01 | 0.01 | 0.01 | 0.01 | 0.01 | 0.01 | 0.01 | 0 | 0 |
| 0 | 0 | 0 | 0.01 | 0.01 | 0.01 | 0.01 | 0.01 | 0 | 0 | 0 |
| 0 | 0 | 0 | 0 | 0 | 0 | 0 | 0 | 0 | 0 | 0 |

| 0.04 | 0.17 | 0.04 |
|------|------|------|
| 0.17 | 0    | 0.17 |
| 0.04 | 0.17 | 0.04 |

*1102*

| 0.04 | 0.15 | 0.04 |
|------|------|------|
| 0.19 | 0    | 0.19 |
| 0.04 | 0.15 | 0.04 |

*1103*

| 0.01 | 0.03 | 0.12 | 0.03 | 0.01 |
|------|------|------|------|------|
| 0.03 | 0.07 | 0.15 | 0.07 | 0.03 |
| 0.12 | 0.15 | 0    | 0.15 | 0.12 |
| 0.17 | 0.07 | 0.15 | 0.07 | 0.03 |
| 0.01 | 0.03 | 0.12 | 0.03 | 0.01 |

FIG.10
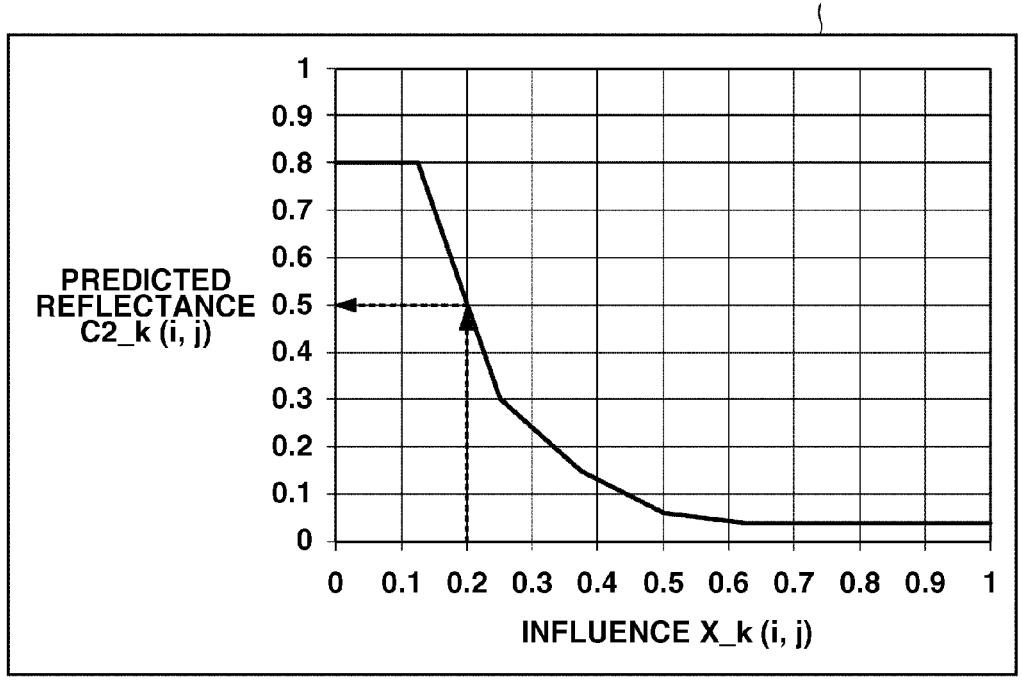
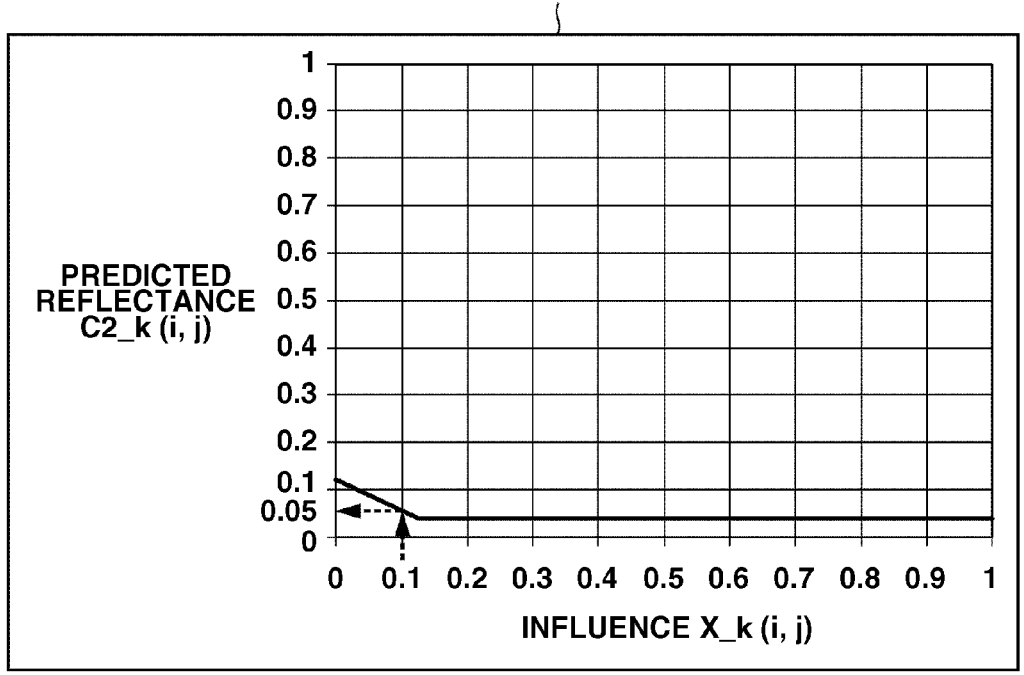

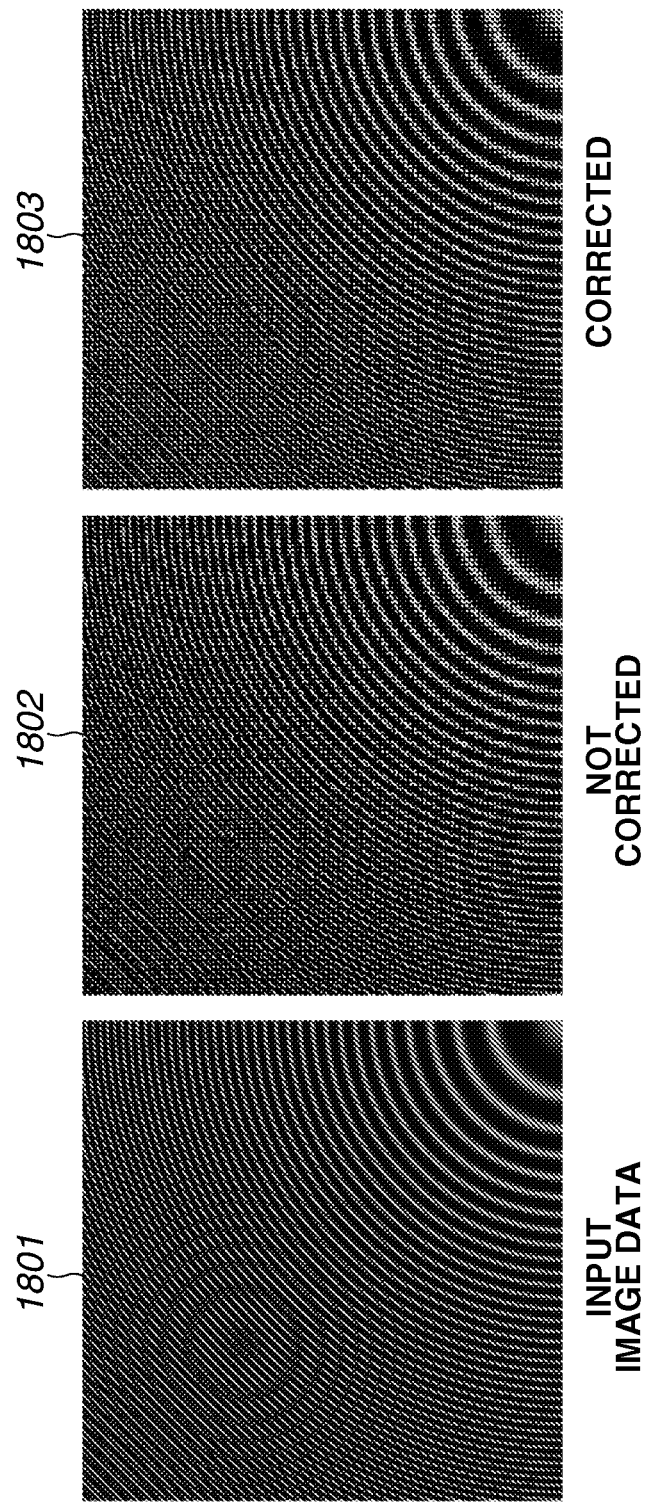

IMAGE PROCESSING APPARATUS AND IMAGE PROCESSING METHOD TO GENERATE HALFTONE IMAGE DATA BASED ON PREDICTION OF DENSITY CORRESPONDING TO RESOLUTION OF IMAGE TO BE PRINTED

BACKGROUND OF THE INVENTION

1. Field of the Invention

The present invention relates to a halftone processing method.

2. Description of the Related Art

In a conventional method for forming an image on a recording medium, halftone processing is often used in reproducing the density with a limited gradation number. Halftone processing is processing for expressing the gradation by changing the ratio of a color material adhering region.

Halftone processing includes processing for converting image data on an amplitude modulation (AM) screen (hereinafter simply referred to as "AM screen processing") and processing for converting image data on a frequency modulation (FM) screen (hereinafter simply referred to as "FM screen processing"). In the AM screen processing, the gradation is expressed by modulating the dimension of a color material-adhering region (i.e., the size of halftone dots). In addition, in the AM screen processing, halftone dots have a characteristic shape, are oriented in a characteristic orientation (at a halftone-dot angle), and are arranged in a periodical intimate contact with one another (i.e., by periodical screen ruling).

On the other hand, in the FM screen processing, tiny dots of the same specific size are spatially arranged in a dispersed manner at random. In addition, in the FM screen processing, the gradation is expressed by the density of arrangement of tiny dots.

In forming an image by using the FM screen processing, it is necessary to stably record tiny dots. Accordingly, the AM screen processing is used by an image forming apparatus that cannot stably reproduce tiny dots. However, in using the AM screen processing, a phenomenon, such as moire on a document, broken thin lines, or jaggy may occur.

The phenomenon of document moire is a periodical pattern that is visually recognized if high frequency components of an input image interfere with periodically arranged halftone dots and if the high frequency components of the input image are folded into a low frequency region. The phenomenon of broken thin line may occur if the angle of the thin line is close to the angle of halftone dots so that the thin line and the halftone dots interfere with one another. The phenomenon of jaggy may occur if the angle of an edge of an image is close to the angle of halftone dots so that the edge interferes with the halftone dots.

The above-described phenomena may become more visible as the screen ruling of halftone dots in AM screen processing becomes low. In order to solve the above-described problem, a conventional method switches between AM screen processing and FM screen processing according to the state of an image region.

More specifically, the conventional method uses the FM screen processing, instead of using the AM screen processing, for an image region in which document moire, broken thin line, or jaggy occurs. However, the FM screen processing has a gradation characteristic different from a gradation characteristic of the AM screen processing.

In the FM screen processing, dots in a highlight region may not be more concentrated than dots in AM screen processing are. Accordingly, more dots may be lost in the case of FM screen processing than in AM screen processing. As a result, the density of a highlight region may become low in FM screen processing.

Furthermore, in FM screen processing, dots are more highly dispersed in a range from a halftone region to a shadow region compared with the dots processed by the AM screen processing. Accordingly, the gain of dots may become high. As a result, in the FM screen processing, the density may become high in the range from the halftone region to the shadow region.

Accordingly, if the type of screen processing is changed according to which image region is to be processed, the density may vary for each image region. In order to solve the above-described problem, Japanese Patent Application Laid-Open No. 07-333822 discusses a method that uses different gradation correction tables for regions processed by different types of screen processing.

With the method discussed in Japanese Patent Application Laid-Open No. 07-333822, the region processed by FM screen processing and the region processed by AM screen processing can have the same gradation characteristic. However, according to the method discussed in Japanese Patent Application Laid-Open No. 07-333822, the following problem may arise.

A gradation correction table is generated by color-measuring a uniform patch image which does not have a spatial frequency component except direct current (DC) components. Accordingly, gradation correction can be executed on a uniform image region with high accuracy. On the other hand, the gradation of an image region whose spatial frequency is high cannot be always appropriately corrected.

The gradation characteristic may vary according to the type of screen processing to be executed and the spatial frequency of an input image. In an image region whose spatial frequency is high, dots may likely to be highly dispersed and the gain of dots may easily become high. Accordingly, the density of the high-spatial frequency image region may more easily become high compared with an image region whose spatial frequency is low.

Accordingly, if the same gradation correction table is used in processing image regions of different spatial frequencies, a target density cannot be reproduced for a high-spatial frequency image region.

SUMMARY OF THE INVENTION

The present invention is directed to an image processing apparatus capable of appropriately detecting a difference between an input image and a halftone-processed image and of generating a high quality image of appropriately reproduced colors.

According to an aspect of the present invention, an image processing apparatus configured to convert input image data into halftone image data by halftone-processing the input image data includes a prediction unit configured to predict a density of a pixel of interest, which is achieved when the halftone image data is printed, based on a group of halftone-processed pixels neighboring the pixel of interest according to a prediction method determined according to a halftone-processed pixel value of the pixel of interest, and a control unit configured to control the halftone processing according to the density predicted by the prediction unit.

According to an exemplary embodiment of the present invention, a difference between an input image and a halftone-processed image can be appropriately detected and a high quality image of appropriately reproduced colors can be generated.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 7 illustrates an example of a filter factor according to the first exemplary embodiment of the present invention.

FIG. 9 illustrates an example of another filter factor according to the first exemplary embodiment of the present invention.

FIG. 10 is a graph illustrating a predicted reflectance calculation look-up table according to the first exemplary embodiment of the present invention.

FIG. 17 illustrates an example of a processing result according to the second exemplary embodiment of the present invention.

DESCRIPTION OF THE EMBODIMENTS

Various exemplary embodiments, features, and aspects of the invention will be described in detail below with reference to the drawings.

Figure 1:
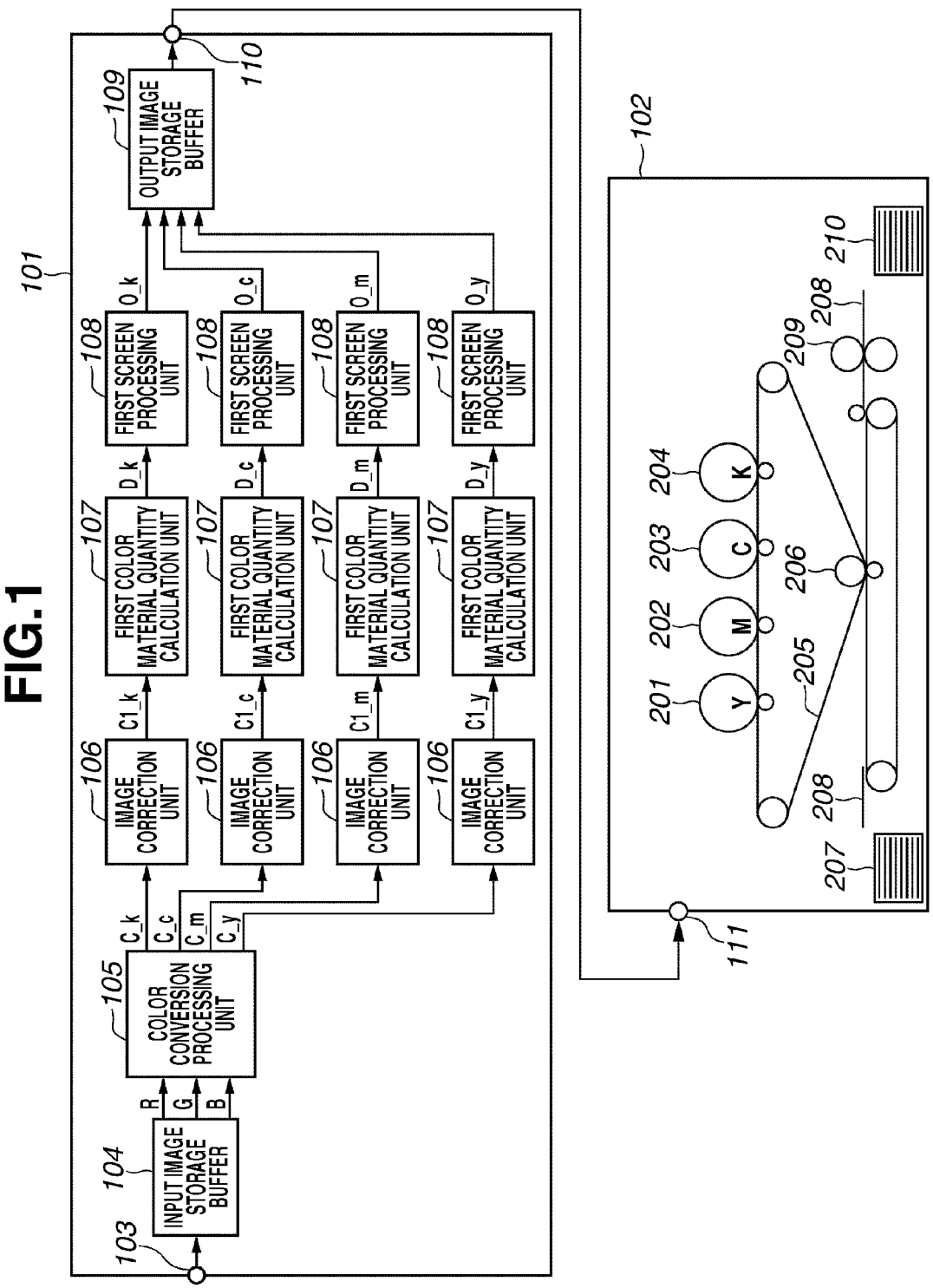
FIG. 1 is a block diagram illustrating an exemplary configuration of an image processing apparatus and an image forming apparatus according to a first exemplary embodiment of the present invention.

FIG. 1 is a block diagram illustrating an exemplary configuration of an image processing apparatus 101 and an image forming apparatus 102 according to a first exemplary embodiment of the present invention. The image processing apparatus 101 has a function for executing various types of image processing on input image data. The image processing to be executed on image data will be described in detail below. The image forming apparatus 102 has a function for printing an image on a recording medium based on image data output from the image processing apparatus 101. The image processing apparatus 101 is a general-purpose personal computer (PC), on which a driver compliant with the image forming apparatus 102, for example, is previously installed.

Each configuration of the image processing apparatus is implemented by a computer by executing a predetermined program. As another exemplary configuration, the image forming apparatus 102 can include the image processing apparatus 101.

The image processing apparatus 101 and the image forming apparatus 102 are mutually connected by an interface or a circuit. The image processing apparatus 101 inputs image data to be printed via an input terminal 103 and stores the input image data on an input image buffer 104.

A color conversion processing unit 105 color-separates the input image data stored on the input image buffer 104 into color component data corresponding to the color of a color material provided to the image forming apparatus 102. In the present exemplary embodiment, the color conversion processing unit 105 separates the input image data into reflectance data for each color component. A color separation look-up table (LUT), which is stored on a color separation look-up table storage unit (not illustrated), is referred to during color conversion processing.

An image correction unit 106 predicts a recorded color characteristic of image data, which is generated by screen-processing an input image and which is printed by the image forming apparatus 102. In addition, the image correction unit 106 corrects the input image. The detailed configuration of the image correction unit 106 will be described in detail later below.

A first color material quantity calculation unit 107 calculates first color material quantity data of each of a plurality of colors based on the reflectance data, which is corrected by the image correction unit 106. A color material quantity-reflectance conversion look-up table is used for color material quantity calculation processing.

A first screen processing unit 108 executes screen processing on the first color material quantity data output from the first color material quantity calculation unit 107 and stores the screen-processed data on a screen image storage buffer 109 as first screen-processed data. The first screen-processed data stored on the screen image storage buffer 109 is output to the image forming apparatus 102 via an output terminal 110.

The image forming apparatus 102 is configured to print an image on a recording medium by using an electrophotographic method. However, the configuration of the image forming apparatus 102 is not limited to a specific configuration. More specifically, the image forming apparatus 102 can be configured at least to print an image output from the image processing apparatus 101 on a recording medium.

Alternatively, various other printing methods, such as an inkjet printing method, a thermal sublimation printing method, a thermal transfer printing method, or an offset printing method can be used.

The image forming apparatus 102 includes photosensitive drums 201 through 204, an intermediate transfer belt 205, a transfer unit 206, a paper feed tray 207, a recording medium (sheet) 208, a fixing unit 209, and a discharge tray 210. The image forming apparatus 102 forms latent images on the photosensitive drums 201 through 204 for colors of cyan (C), magenta (M), yellow (Y), and black (K) based on first screen-processed data output from the image processing apparatus 101.

Subsequently, toner images are formed based on the latent images that have been formed on each of the photosensitive drums 201 through 204. The formed toner images are transferred onto the intermediate transfer belt 205. In this manner, a full color image is formed on the intermediate transfer belt 205.

The full color image is transferred by the transfer unit 206 onto the sheet 208, which has been fed from the paper feed tray 207 and then is fixed by the fixing unit 209. The sheet having the color image fixed thereon is conveyed to the discharge tray 210.

The first screen processing unit 108 will be described in detail below. The first screen processing unit 108 stores threshold value tables Th_c, Th_m, Th_y, and Th_k, which correspond to the colors of CMYK, respectively. In the threshold value tables Th_c, Th_m, Th_y, and Th_k, integer values ranging from 0 to 255, each of which corresponds to each pixel of the first color material quantity data, are arranged.

The first screen processing unit 108 compares the first color material quantity data of a pixel of interest and the corresponding threshold value table and outputs first screen-processed data.

For easier understanding, screen processing to be executed on black first color material quantity data D_k will be described in detail below as representative first color material quantity data of cyan, magenta, and yellow first color material quantity data. The same screen processing as that executed on the black first color material quantity data D_k is executed for cyan, magenta, and yellow colors.

Figure 3:
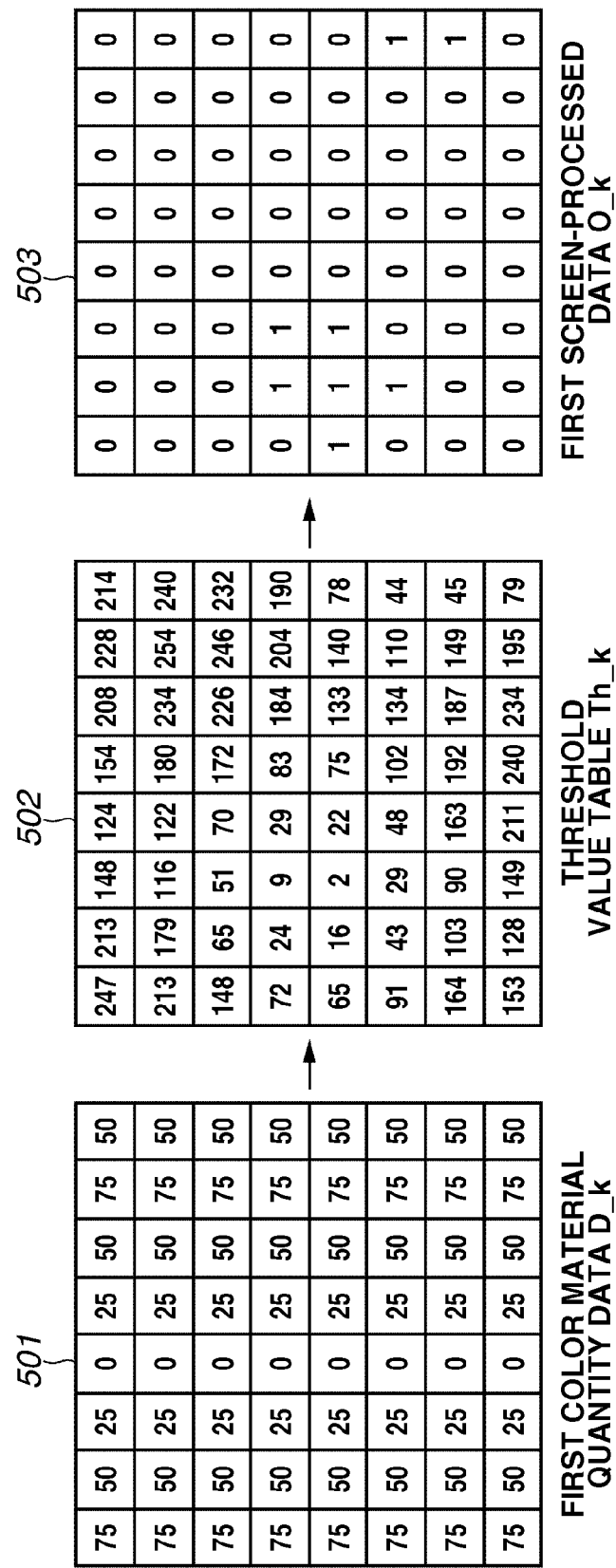
FIG. 3 illustrates an example of screen processing according to the first exemplary embodiment of the present invention.

FIG. 3 illustrates an example of the screen processing executed on the black first color material quantity data D_k.

Referring to FIG. 3, the first screen processing unit 108 compares the first color material quantity data D_k 501 and the threshold value table Th_k 502 pixel by pixel. If the first color material quantity data D_k 501 is larger than the corresponding threshold value, a value "1" is output as the first screen-processed data O_k 503. On the other hand, if the first color material quantity data D_k 501 is smaller than the corresponding threshold value, a value "0" is output as the first screen-processed data O_k 503.

In the present exemplary embodiment, the screen processing is executed on input image data of 256-level gray scale to convert the image data into data of 2-level gray scale. However, the present invention is not limited to this.

The first color material quantity calculation unit 107 will be described in detail below. The first color material quantity calculation unit 107 calculates first color material quantity data D_k, D_c, D_m, and D_y based on post-correction reflectance data C1_k, C1_c, C1_m, and C1_y output from the image correction unit 106 pixel by pixel.

The reflectance data is an aggregate of reflectance values of pixels indicated with integers of 0 and 1 and denotes a recorded color characteristic of the input image data. The color material quantity data is data including the color material quantity of each of the colors of CMYK recorded by the image forming apparatus 102 for each pixel by using the integers ranging from 0 to 255.

In the present exemplary embodiment, the color material quantity is calculated by using the color material quantity-reflectance conversion look-up table.

Figure 4:
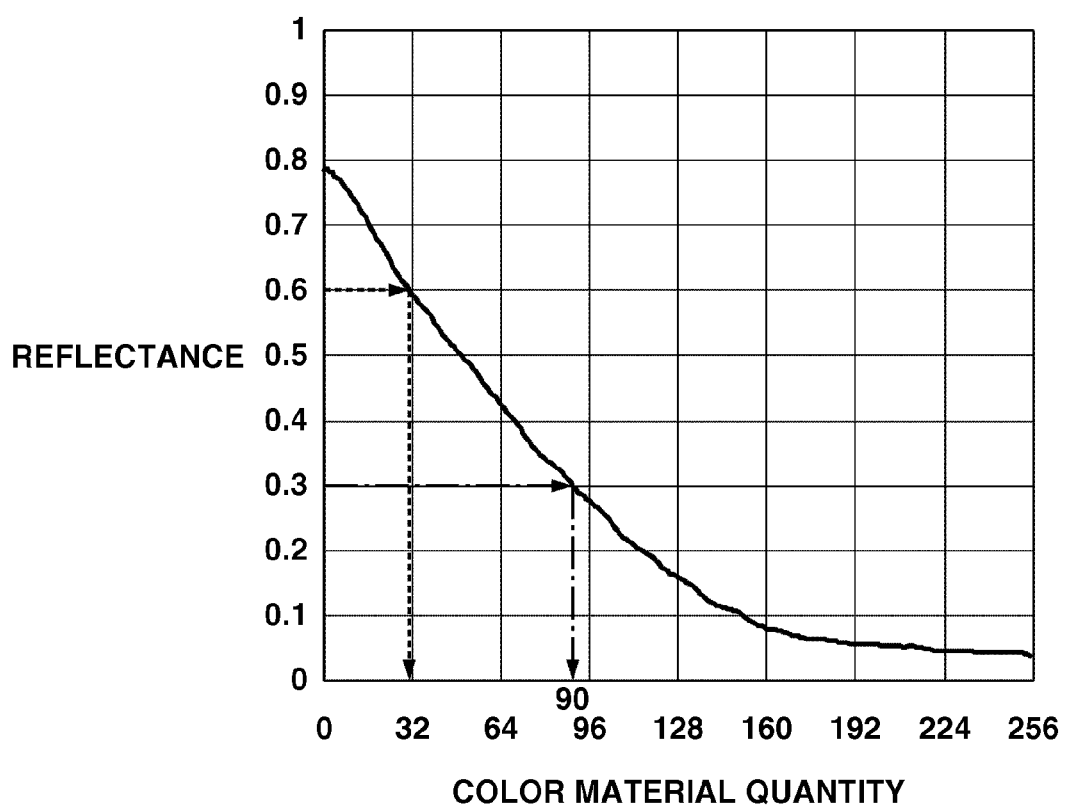
FIG. 4 is a graph illustrating an example of a color material quantity-reflectance conversion look-up table according to the first exemplary embodiment of the present invention.

FIG. 4 is a graph illustrating an example of a color material quantity-reflectance conversion look-up table K_LUT_1D corresponding to the color of black. Referring to FIG. 4, the color material quantity is taken on the horizontal axis and the reflectance is taken on the vertical axis.

If a value "0.6" is input as a value of the reflectance of a pixel of interest, the graph is referred to in a direction indicated with an arrow in FIG. 4 and outputs a value "32" as the value of the color material quantity. Similarly, if a value "0.3" is input as a value of the reflectance of a pixel of interest, a value "90" is output as the value of the color material quantity. By converting the reflectance into the color material quantity for each pixel, the first color material quantity data is generated.

The above-described processing is executed for the color of black. The first color material quantity calculation unit 107 executes similar processing for the other colors of cyan, magenta, and yellow by using the color material quantity-reflectance conversion look-up table corresponding to each color material.

Figure 5:
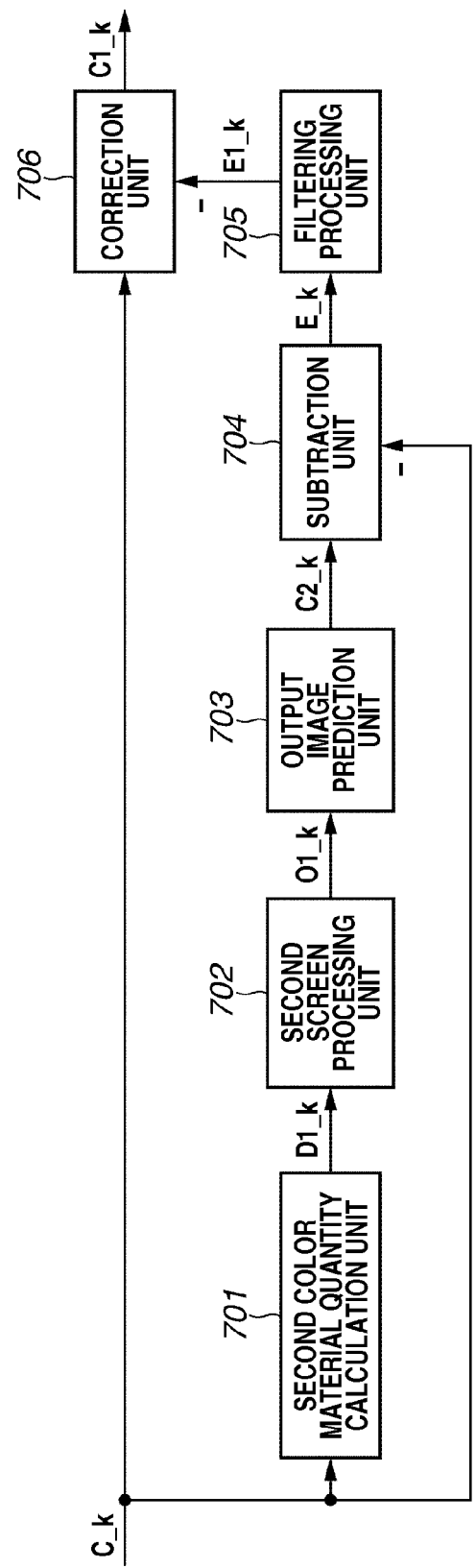
FIG. 5 is a block diagram illustrating an exemplary configuration of an image correction unit according to the first exemplary embodiment of the present invention.

The image correction unit 106 will be described in detail below with reference to FIG. 5. FIG. 5 is a block diagram illustrating the image correction unit 106 (FIG. 1) in detail.

Referring to FIG. 5, the image correction unit 106 includes a second color material quantity calculation unit 701, a second screen processing unit 702, a output image prediction unit 703, a subtraction unit 704, a filtering processing unit 705, and a correction unit 706.

In the following description, the image correction unit 106, which is configured to process post-color conversion reflectance data C_k for the color of black, will be described in detail. The image correction units 106 for processing the post-color conversion reflectance data C_c, C_m, and C_y for the colors of cyan, magenta, and yellow have the same configuration as the following.

Figure 6:
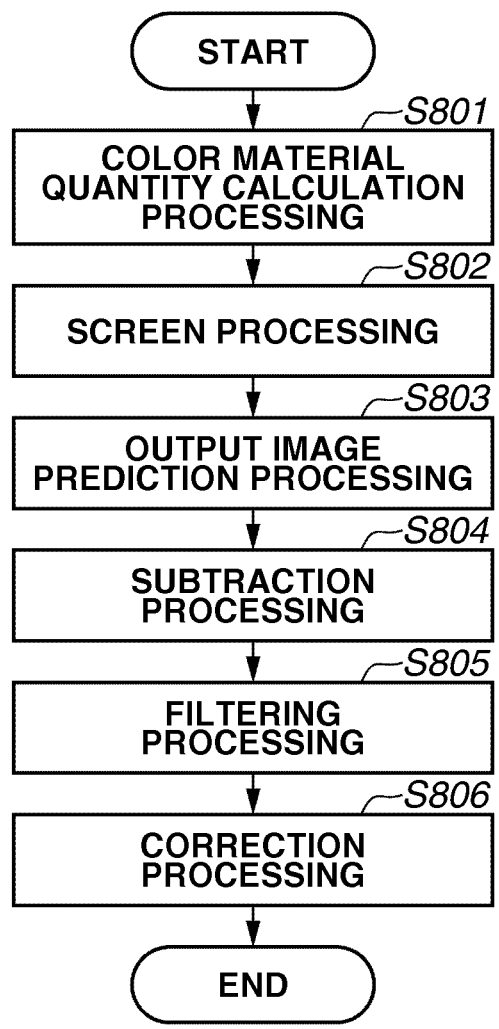
FIG. 6 is a flow chart illustrating an exemplary flow of image correction processing according to the first exemplary embodiment of the present invention.

FIG. 6 is a flow chart illustrating an exemplary flow of image correction processing executed by the image correction unit 106 according to the first exemplary embodiment.

In step S801, the second color material quantity calculation unit 701 converts the post-color conversion reflectance data C_k into second color material quantity data D1_k. In addition, the second color material quantity calculation unit 701 calculates the color material quantity for each pixel by using the same color material quantity-reflectance conversion look-up table as that used by the first color material quantity calculation unit 107 and outputs the second color material quantity data D1_k.

In step S802, the second screen processing unit 702 executes screen processing on the second color material quantity data D1_k output from the second color material quantity calculation unit 701. In addition, the second screen processing unit 702 outputs second screen-processed data O1_k. The second screen processing unit 702 executes the same screen processing as that executed by the first screen processing unit 108.

In step S803, the output image prediction unit 703 predicts the reflectance to be acquired if printing is executed by using the black color material based on the second screen-processed data O1_k and outputs predicted reflectance data. The predicted reflectance data is an aggregate including the predicted reflectance of each pixel.

The predicted reflectance of each pixel is calculated based on the second screen-processed data O1_k for the pixel of interest and the influence from neighboring pixels. The predicted reflectance is the data described by the real numbers of values of 0 and 1. The processing will be described in detail later below.

In step S804, the subtraction unit 704 subtracts predicted reflectance data C2_k output from the output image prediction unit 703 from the target post-color conversion reflectance data C_k to calculate difference data E_k.

In step S805, the filtering processing unit 705 executes filtering on the difference data E_k by using a filter factor illustrated in FIG. 7 to calculate correction amount data E1_k. The filter factor is determined according to a characteristic of the first screen processing unit 108.

More specifically, if the halftone dot screen ruling of the screen processing executed by the first screen processing unit 108 is low, a filter factor of a low cutoff frequency is used. On the other hand, if the halftone dot screen ruling is high, a filter factor of a high cutoff frequency is used. In the above-described manner, high frequency components not necessary for correction are removed from the difference data E_k. As a result, appropriate correction amount data is calculated.

When input image data is corrected by using the difference data E_k including high frequency components, a moire pattern or a texture pattern may be generated due to the first screen processing by the first screen processing unit 108. Accordingly, if no unnecessary high frequency component is included in the difference data E_k, the filtering can be omitted.

In step S806, the correction unit 706 corrects the post-color conversion reflectance data C_k by using the correction amount data E1_k and outputs post-correction reflectance data C1_k. When the above-described processing is executed in the above-described manner, the entire processing executed by the image correction unit 106 is completed.

An exemplary configuration of the output image prediction unit 703 will be described in detail. For easier understanding, the output image prediction unit 703 used for processing the second screen-processed data O1_k for black will be described in detail. The output image prediction unit 703 used for processing the screen-processed data of cyan, magenta, and yellow have the same configuration as the following.

Figure 8:
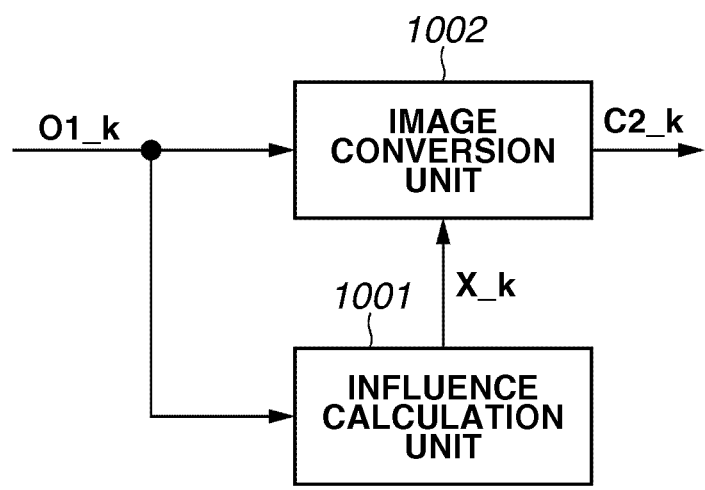
FIG. 8 is a block diagram illustrating an exemplary configuration of an output image prediction unit according to the first exemplary embodiment of the present invention.

FIG. 8 is a block diagram illustrating an exemplary configuration of the output image prediction unit 703 (FIG. 5) in detail. Referring to FIG. 8, the output image prediction unit 703 includes an influence calculation unit 1001 and an image conversion unit 1002.

The influence calculation unit 1001 executes filtering on the second screen-processed data O1_k to calculate influence data X_k. The influence data X_k describes the influence on a pixel of interest on a recording medium having an image printed thereon from a color material existing in an neighboring pixel group.

The filter factor F1 is a weight on a pixel group existing around a pixel of interest (hereinafter simply referred to as an "neighboring pixel"). When an actual printing is executed based on the second screen-processed data O1_k, the reflectance of the pixel of interest receives an influence from the neighboring pixels.

Accordingly, the influence calculation unit 1001 executes filtering on the second screen-processed data O1_k for the neighboring pixels in calculating the influence that the pixel of interest receives. The filter factor F1 is set according to the characteristic of the image forming apparatus 102.

FIG. 9 illustrates an example of the filter factor F1. Referring to FIG. 9, three filter factors are illustrated. The value of the pixel of interest (center) is "0" for each of the filter factors. This indicates that if any dot exists in the pixel of interest in the second screen-processed data O1_k, the influence on the pixel of interest itself is "0".

The second screen-processed data O1_k describes information about whether to record dots by using a value "0" or "1". In the second screen-processed data O1_k, the value "1" describes that the dots are to be recorded. The value "0" describes that the dots are not to be recorded.

For the filter factor, the weight on pixels vertically and horizontally neighboring the pixel of interest is set higher than the weight on pixels neighboring the pixel of interest in a diagonal direction. This indicates that for the pixel of interest on a recording medium having an image printed thereon, the influence from the pixels neighboring the pixel of interest is higher than the influence from the pixels neighboring the pixel of interest in the diagonal direction.

For filter factors 1101 and 1102, a pixel group including eight pixels neighboring the pixel of interest is weighted. This indicates that for the filter factors 1101 and 1102, the pixel of interest on the recording medium having a printed image thereon receives an influence from the pixel group including eight neighboring pixels.

On the other hand, for a filter factor 1103, a pixel group including twenty-four pixels neighboring the pixel of interest is weighted. This indicates that a specific pixel of interest on the recording medium having an image printed thereon is affected by the pixel group including twenty-four pixels neighboring thereto.

If the resolution of the image forming apparatus 102 is high, the pixel number that has an influence on the pixel of interest increases. Accordingly, in calculating a prediction value of the reflectance of a high-resolution output image, filtering can be executed by using a high filter factor.

For the filter factor 1102, the weight on the pixels neighboring the pixel of interest in the horizontal direction is set higher than the weight on the pixels neighboring the pixel of interest in the vertical direction. More specifically, the influence from dots neighboring a pixel of interest in the horizontal direction on a recording medium having an image printed thereon may be higher than the influence from dots neighboring the pixel of interest in the vertical direction.

For example, for an image output from the image forming apparatus 102, the above-described case may arise if dots are dispersed more in the horizontal direction. The filter factor 1102 is set at a value appropriate for printing executed by using such an image forming apparatus 102. As described above, the influence calculation unit 1001 calculates the influence by referring to the filter factor that is appropriately set according to the characteristic of the image forming apparatus 102.

The image conversion unit 1002 calculates the predicted reflectance data C2_k based on the second screen-processed data O1_k and the influence data X_k.

In the present exemplary embodiment, the location of a pixel of interest is expressed as "(i, j)" by using coordinates "i" and "j". In addition, a value of the second screen-processed data O1_k at a pixel (i, j) is expressed as "second post-screen processing pixel value O1_k(i, j)". Similarly, the influence data X_k at the pixel (i, j) is expressed as "the influence X_k(i, j)" and the predicted reflectance data C2_k at the pixel (i, j) is expressed as "the predicted reflectance C2_k (i, j).

FIG. 10 is a graph illustrating a predicted reflectance calculation look-up table, which is used in calculating the predicted reflectance C2_k(i, j) at the pixel (i, j). Referring to FIG. 10, the predicted reflectance C2_k(i, j), is taken on the vertical axis and the influence X_k(i, j) is taken on the horizontal axis. In the present exemplary embodiment, the look-up table is referred to as a "predicted reflectance calculation look-up table".

A predicted reflectance calculation look-up table 1201 is used when the second post-screen processing pixel value O1_k(i, j) for the pixel of interest is "0". If the second post-screen processing pixel value O1_k(i, j) is "0", no dot is recorded on the pixel of interest. Accordingly, the reflectance of the pixel of interest itself should become the reflectance of the ground of paper.

However, if any dot (color material) exists in the neighboring pixels, the reflectance of the pixel of interest is affected by the neighboring pixels. Accordingly, the reflectance of the pixel of interest becomes far lower than the reflectance of the ground of paper.

Thus, the predicted reflectance calculation look-up table 1201 is used in calculating the reflectance of the pixel of interest obtained when printing is actually executed. On the other hand, a predicted reflectance calculation look-up table 1202 is used when the second post-screen processing pixel value O1_k(i, j) for the pixel of interest has a value "1".

When the second post-screen processing pixel value O1_k (i, j) has a value "1", a dot is recorded on the pixel of interest. Accordingly, the reflectance of the pixel of interest itself becomes the same as the reflectance of the dot (color material). However, in this case, if almost no dots (color materials) are recorded on neighboring pixels, the reflectance of the pixel of interest becomes affected by the reflectance of the ground of paper. Accordingly, the predicted reflectance calculation look-up table 1202 is used in calculating the reflectance of the pixel of interest obtained when printing is actually executed.

As described above, the present exemplary embodiment changes the predicted reflectance calculation look-up table to be used according to the pixel value obtained after the pixel (i, j) is screen-processed.

The image conversion unit 1002 calculates the predicted reflectance C2_k(i, j) with high accuracy by referring to two different types of predicted reflectance calculation look-up tables according to the pixel of interest. In other words, the recorded color characteristic (i.e., the reflectance) after printing is predicted according to a prediction method determined according to the post-screen processing pixel value of the pixel of interest.

Now, the predicted reflectance calculation look-up table 1201, which is used when no dot is recorded on the pixel of interest, will be described below. If the second post-screen processing pixel value O1_k(i, j) has a value "0" and the influence X_k(i, j) has a value "0", the pixel (i, j) is not affected by the neighboring pixels. Accordingly, the reflectance of the pixel of interest becomes the reflectance of the recording medium itself.

In the present exemplary embodiment, the recording medium used by the image forming apparatus 102 is paper. Accordingly, if the second post-screen processing pixel value O1_k(i, j) for the pixel of interest has a value "0" and if the influence X_k(i, j) on the pixel of interest also has a value "0", the reflectance of the pixel of interest becomes the reflectance of the ground of paper.

On the other hand, if no dot is recorded on the pixel of interest and if the influence X_k(i, j) on the pixel of interest has a value greater than "0", the predicted reflectance C2_k(i, j) of the pixel of interest becomes lower than the reflectance of the ground of paper. This is because the color material existing on the neighboring pixels has an influence on the pixel of interest and the reflectance of the pixel (i, j) becomes lower than the reflectance of the pixel of interest itself (the reflectance of the ground of paper).

For the predicted reflectance calculation look-up table, the predicted reflectance C2_k(i, j) is set as close to the reflectance at the time of actual printing as possible to predict the reflectance with high accuracy.

Now, the predicted reflectance calculation look-up table 1202, which is used when a dot is recorded on the pixel of interest, will be described below.

If the second post-screen processing pixel value O1_k(i, j) has a value "1" and if the influence X_k(i, j) has a value greater than "0" by a specific value, the predicted reflectance of the pixel of interest becomes the reflectance of the color material itself. This is because as the influence from the dots on the neighboring pixels on the pixel (i, j) becomes greater, the reflectance of the pixel (i, j) converges around the reflectance of the color material itself.

The reflectance of the color material itself refers to the reflectance of a single-color solid patch image. A solid patch image is a uniform patch of several centimeters square, which is generated by recording the color material on the recording medium at the maximum quantity. In this case, the reflectance of the solid patch image refers to a macroscopic reflectance of a single-color solid patch image generated by using a black color material.

On the other hand, if the second post-screen processing pixel value O1_k(i, j) of the pixel of interest has a value "1" and the influence X_k(i, j) has a value "0" or therearound, the predicted reflectance of the pixel of interest becomes slightly greater than the reflectance of the color material itself in the predicted reflectance calculation look-up table. In the present exemplary embodiment, the image forming apparatus 102 uses the electrophotographic method. Accordingly, an isolated dot may not be appropriately reproduced.

More specifically, if no dot exists around the pixel (i, j) on which a dot is recorded (i.e., if the influence X_k(i, j) has a value "0"), some of the dots to be recorded on the pixel (i, j) may be lost or all the dots may not be recorded.

Accordingly, in the present exemplary embodiment, in which the image forming apparatus 102 employs the electrophotographic method, in order to correctly simulate the above-described phenomenon of lost dots, if the second post-screen processing pixel value O1_k(i, j) has a value "1" and the influence X_k(i, j) has a value "0" or therearound, the predicted reflectance C2_k(i, j) of the pixel of interest is set slightly higher than the reflectance of the color material itself.

Now, an exemplary method for calculating the predicted reflectance C2_k(i, j) of the pixel (i, j) by using the predicted reflectance calculation look-up table will be described below.

If the second post-screen processing pixel value O1_k(i, j) of the pixel of interest has a value "0" (i.e., if no dot is recorded), the image conversion unit 1002 refers to the predicted reflectance calculation look-up table 1201. In addition, the image conversion unit 1002 calculates the predicted reflectance C2_k(i, j) based on the influence X_k(i, j) on the pixel of interest.

If the influence X_k(i, j) on the pixel of interest has a value "0.2", the predicted reflectance C2_k(i, j) of the pixel of interest has a value "0.5".

On the other hand, if the second post-screen processing pixel value O1_k(i, j) of the pixel of interest has a value "1" (i.e., if a dot is recorded), the image conversion unit 1002 refers to the predicted reflectance calculation look-up table

1202 to calculate the predicted reflectance C2_k(i, j) of the pixel of interest based on the influence X_k(i, j) on the pixel of interest. In this case, if the influence X_k(i, j) on the pixel of interest has a value "0.1", the predicted reflectance C2_k(i, j) of the pixel of interest has a value "0.05".

As described above, the image conversion unit 1002 changes the predicted reflectance calculation look-up table to be used according to whether a dot is recorded on the pixel of interest. This is because the influence from the neighboring pixels differs according to whether a dot is recorded on the pixel of interest (whether the color material is applied or whether the reflectance of the pixel of interest is the same as the reflectance of the ground of paper).

The reflectance of the pixel of interest from the color material existing on the neighboring pixels becomes greater in the case where no dot is recorded than in the case where a dot is recorded Now, an exemplary image processing method executed by the image processing apparatus 101 will be described in detail below with reference to the flow chart of FIG. 2. Each step is executed on all pixels.

Figure 2:
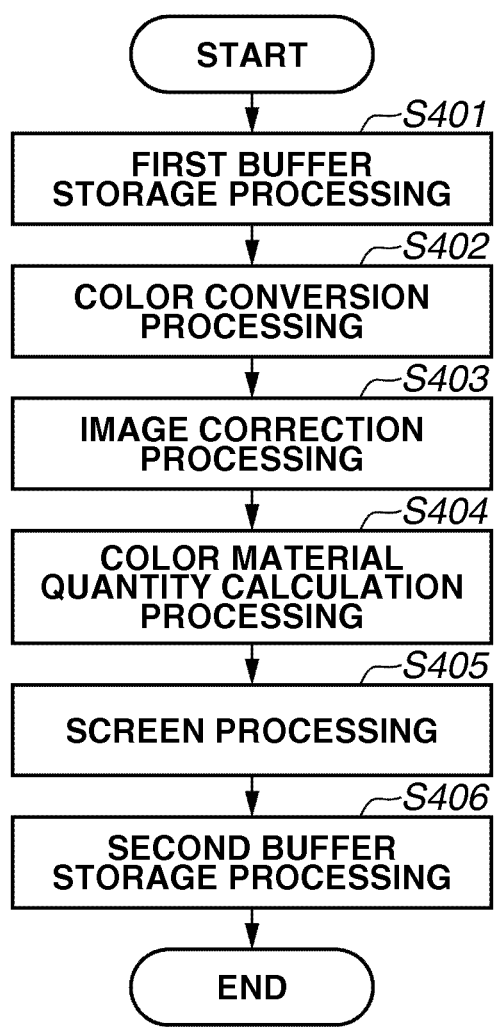
FIG. 2 is a flow chart illustrating exemplary image processing according to a first exemplary embodiment of the present invention.

Referring to FIG. 2, in step S401, the image processing apparatus 101 inputs image data of multi-gradation from the input terminal 103 and stores the input image data on the input image buffer 104. The input image data includes three color components of red (R), green (G) and blue (B).

In step S402, the color conversion processing unit 105 executes color conversion processing on the input image data stored on the input image buffer 104 by using a color separation LUT stored on a color separation LUT storage unit (not illustrated).

More specifically, the color conversion processing unit 105 converts each color component of the input image data into a color component of a color material used by the image forming apparatus 102. The image forming apparatus 102 according to the present exemplary embodiment uses four color materials of black (K), cyan (C), magenta (M), and yellow (Y).

Therefore, in the color conversion processing, the input RGB image data is converted into CMYK data by using the following expressions:

$$C\_k = k\_LUT\_3D(R,G,B) \quad (1)$$

$$C\_c = C\_LUT\_3D(R,G,B) \quad (2)$$

$$C\_m = M\_LUT\_3D(R,G,B) \quad (3)$$

$$C\_y = Y\_LUT\_3D(R,G,B) \quad (4)$$

In the present exemplary embodiment, each function defined by the right hand of the expressions (1) through (4) corresponds to the content of the color separation look-up table (LUT).

For the color separation LUT, the reflectance data corresponding to each of the CMYK color materials is acquired based on three input values of RGB. Each piece of the input image data R, G, B is image data whose gradation is expressed by the integers of values ranging from 0 to 255. Each of the post-color conversion reflectance data C_k, C_c, C_m, and C_y is data that describes the reflectance of each color component by using the real numbers of the values of 0 and 1. More specifically, each of the post-color conversion reflectance data C_k, C_c, C_m, and C_y is target reflectance data, which is a target in printing each of CMYK color materials on the recording medium as a single-color material.

For example, the post-color conversion reflectance data C_k is reflectance data to be reproduced when printing is executed by using the black color material based on the input image data. The color conversion processing ends after executing the above-described processing.

In step S403, the image correction unit 106 executes correction on each piece of the post-color conversion reflectance data C_k, C_c, C_m, and C_y and outputs post-correction reflectance data C1_k, C1_c, C1_m, and C1_y.

Similar to the post-color conversion reflectance data C_k, C_c, C_m, and C_y, the post-correction reflectance data C1_k, C1_c, C1_m, and C1_y describe the reflectance of each color component by using the real numbers of 0 and 1.

The processing in step S403 will be described about the case of executing processing on the color of black. Processing similar to the following is executed on the other colors of cyan, magenta, and yellow.

To begin with, the second color material quantity calculation unit 701 converts the reflectance values of all the pixels into color material quantity values by using the color material quantity-reflectance conversion look-up table illustrated in FIG. 4 and calculates the second color material quantity data D1_k.

$$D1\_k = k\_LUT\_1D(C\_k) \quad (5)$$

The second screen processing unit 702 compares the second color material quantity data D1_k and the threshold value table Th_k for each pixel. Thus, the second screen processing unit 702 executes screen processing by using the following expressions (6) and (7) and outputs the second screen-processed data O1_k:

$$\text{When } D1\_k \leq Th\_k, O1\_k = 0 \quad (6)$$

$$\text{When } D1\_k > Th\_k, O1\_k = 1 \quad (7)$$

The output image prediction unit 703 calculates a predicted reflectance for each pixel based on the second screen-processed data O1_k. The influence calculation unit 1001 calculates the influence, which indicates the level of influence on the pixel of interest from the pixel group existing around the pixel of interest.

In the present exemplary embodiment, by executing filtering that uses the filter factor 1101 illustrated in FIG. 9, the influence calculation unit 1001 calculates the influences on all the pixels and calculates the influence data X_k.

$$X\_k = O1\_k * F1 \quad (8)$$

where "*" denotes convolution and "F1" denotes the filter factor. As the filter factor F1, the filter factor 1101 illustrated in FIG. 9 is used to execute filtering.

In addition, the image conversion unit 1002 calculates the predicted reflectance data C2_k based on the influence data X_k, which has been received from the influence calculation unit 1001, and the second screen-processed data O1_k of the pixel of interest.

If the second screen-processed data O1_k of the pixel of interest has a value "0", the image conversion unit 1002 refers to the predicted reflectance calculation look-up table 1201 to calculate the predicted reflectance of the pixel of interest. On the other hand, if the second screen-processed data O1_k of the pixel of interest has a value "1", the image conversion unit 1002 refers to the predicted reflectance calculation look-up table 1202 to calculate the predicted reflectance of the pixel of interest.

Subsequently, the subtraction unit 704 calculates the difference data E_k between the predicted reflectance data C2_k and the target post-color conversion reflectance data C_k by using the following expression (9):

$$E\_k = C2\_k - C\_k \quad (9)$$

The filtering processing unit 705 executes filtering on the difference data E_k and calculates the correction amount data E1_k by using the expression (10):

$$E1\_k = E\_k * F \quad (10)$$

where "*" denotes convolution and "F" denotes a filter factor having a low-pass characteristic expressed by the following expression (11):

$$F = \frac{1}{2\pi\sigma^2}\exp\left(-\frac{r^2}{2\sigma^2}\right) \quad (11)$$

where "r" denotes the distance between the filter factor and the origin and "σ" denotes a parameter for changing the characteristic of the filter.

FIG. 7 illustrates an example of the filter factor F for a pixel group including 11×11 pixels, which is used by the filtering processing unit 705. The filter factor F is calculated by substituting the value of the term "σ" of the expression (11) with a value "2.5".

The correction unit 706 executes correction on the post-color conversion reflectance data C_k by using the correction amount data E1_k and calculates the post-correction reflectance data C1_k by using the following expression (12):

$$C1\_k = C\_k - E1\_k \quad (12).$$

By executing the processing in the above-described manner, the image correction processing in step S403 is completed. The same correction processing is executed for the other colors of cyan, magenta, and yellow to generate post-correction reflectance data C1_k, C1_c, C1_m, and C1_y.

In step S404, the first color material quantity calculation unit 107 converts the post-correction image data C1_k, C1_c, C1_m, and C1_y into first color material quantity data D_k, D_c, D_m, and D_y by using the color material quantity-reflectance conversion look-up table illustrated in FIG. 4. The first color material quantity data D_k, D_c, D_m, and D_y are image data expressing the quantity of each of the CMYK color materials, which are used for recording by the image forming apparatus 102, according to the integer of the value of from 0 to 255.

The conversion processing is executed by using the following expressions (13) through (16):

$$D\_k = k\_LUT\_1D(C1\_k) \quad (13)$$

$$D\_c = C\_LUT\_1D(C1\_c) \quad (14)$$

$$D\_m = M\_LUT\_1D(C1\_m) \quad (15)$$

$$D\_y = Y\_LUT\_1D(C1\_y) \quad (16).$$

In step S405, the first screen processing unit 108 executes screen processing on the first color material quantity data D_k, D_c, D_m, and D_y. More specifically, the first screen processing unit 108 compares the first color material quantity data D_k and the threshold value table Th_k for each pixel. Thus, the first screen processing unit 108 executes the screen processing by using the following expressions (17) and (18) and outputs first screen-processed data O_k:

$$\text{When } D\_k \leq Th\_k, O\_k = 0 \quad (17)$$

$$\text{When } D\_k > Th\_k, O\_k = 1 \quad (18).$$

The screen processing executed by the first screen processing unit 108 is similar to the screen processing in step S403 executed by the second screen processing unit 702.

The first screen-processed data O_k, O_c, O_m, and O_y are image data that expresses information about whether the image forming apparatus 102 is to record the color material by using a value "0" or "1". More specifically, "1" describes that a dot is to be recorded and "0" describes that not dot is to be recorded.

In the above-described manner, the black color material quantity data is processed. Similar screen processing is executed on color material quantity data of the other colors of cyan, magenta, and yellow by using threshold value tables Th_c, Th_m, and Th_y corresponding to each color to output first screen-processed data O_c, O_m, and O_y.

By executing the processing in the above-described manner, the screen processing in step S405 is completed.

In step S406, the first screen-processed data O_k, O_c, O_m, and O_y are stored on the output image buffer 109. The screen-processed data are transferred to the image forming apparatus 102 via the output terminal 110. The image forming apparatus 102 prints the received data on a recording medium.

By executing the processing in the above-described manner, all the processing by the image processing unit 101 is completed.

As described above, the present exemplary embodiment having the above-described configuration calculates the difference between input image data and screen-processed data for the pixel of interest according to the characteristic of the image forming apparatus 102 and the influence from neighboring pixels. Accordingly, the present exemplary embodiment can predict the reflectance achieved at the time of actual printing with high accuracy. Accordingly, the present exemplary embodiment can execute appropriate correction processing.

By using the output image prediction unit 703 according to the present exemplary embodiment, if uniform image data is input, the predicted reflectance data becomes substantially identical with the target post-color conversion reflectance data.

Accordingly, if the input image data is uniform data, the difference data calculated by using the expression (16) becomes closer to 0 and the correction amount data becomes approximately 0 by using the expression (17). Accordingly, the image correction unit 106 seldom executes correction on an image generated based on uniform input image data.

On the other hand, in the case of a non-uniform image whose input image data has a high spatial frequency, the dots are highly dispersed and the gain of the dots becomes high. Due to this influence, if printing is executed without executing the correction, the image may be output with a density higher than the density of the target post-color conversion reflectance data.

In the present exemplary embodiment, the image correction unit 106 corrects the post-color conversion reflectance data according to the influence from the neighboring pixels and executes processing based on the post-correction reflectance data by using the color material quantity-reflectance conversion look-up table.

With the above-described configuration, the present exemplary embodiment can appropriately correct an image having a high spatial frequency.

Now, a second exemplary embodiment of the present invention will be described in detail below.

In the above-described first exemplary embodiment, input image data is corrected by subtracting the difference between the predicted reflectance data and the post-color conversion reflectance data from the input image data. However, the reproduction characteristic of the image forming apparatus 102 may degrade because the characteristic of an output image may generally vary according to the gradation value and the spatial frequency characteristic of the input image data.

In order to deal with the non-linearity of the image forming apparatus 102, the present exemplary embodiment is configured to execute more appropriate correction processing.

More specifically, the present exemplary embodiment calculates optimum post-correction image data by executing provisional correction by using a plurality of provisional correction amount values for each pixel. An exemplary configuration of the present exemplary embodiment will be described in detail below.

The configuration of the present exemplary embodiment is the same as the configuration of the first exemplary embodiment except the image correction unit 106. The detailed description of the same configuration as the first exemplary embodiment will not be repeated here.

For easier understanding, the image correction unit used for processing the post-color conversion image C_k of black will be described. The image correction units used for processing the post-color conversion images C_c, C_m, and C_y of cyan, magenta, and yellow have a similar configuration.

Figure 11:
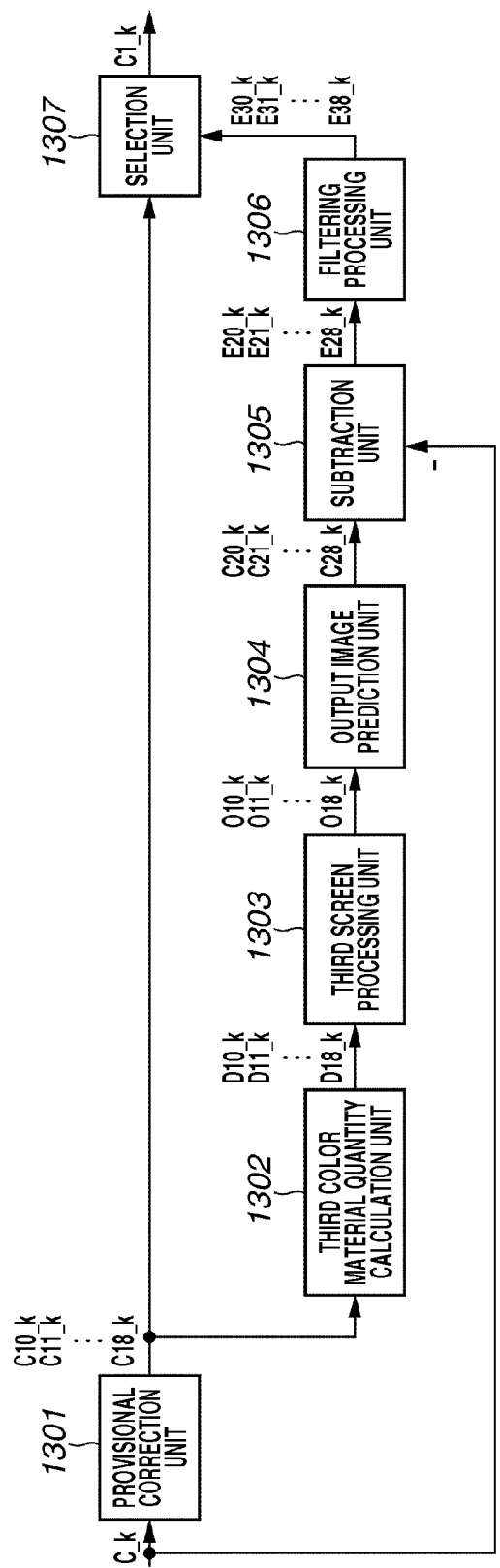
FIG. 11 is a block diagram illustrating an exemplary configuration of an image correction unit according to a second exemplary embodiment of the present invention.

FIG. 11 is a block diagram illustrating an exemplary configuration of the image correction unit 106 that processes the post-color conversion reflectance data C_k of black according to the present exemplary embodiment.

Referring to FIG. 11, a provisional correction unit 1301 executes a plurality of provisional correction processing on the input image data. A third color material quantity calculation unit 1302 converts all pieces of a plurality of provisional post-correction reflectance data output from the provisional correction unit 1301 into color material quantity data.

The third color material quantity calculation unit 1302 has the same configuration as the first color material quantity calculation unit 107, which is used for calculating the color material quantity for the color of black.

A third screen processing unit 1303 executes the same screen processing on a plurality of pieces of third color material quantity data output from the third color material quantity calculation unit 1302. The third screen processing unit 1303 has the same configuration as the first screen processing unit 108, which is used for generating the screen-processed data for the color of black.

An output image prediction unit 1304 predicts the reflectance in actual printing based on each piece of third screen-processed data output from the third screen processing unit 1303 and calculates the predicted reflectance data.

A subtraction unit 1305 calculates the difference data between the pre-provisional input image data and each piece of predicted reflectance data output from the output image prediction unit 1304. In addition, the subtraction unit 1305 outputs difference data corresponding to all pieces of post-provisional correction data.

A filtering processing unit 1306 executes filtering on all pieces of difference data. In addition, the filtering processing unit 1306 executes the filtering by using a filter having the low-pass characteristic similar to the filtering unit 705.

A selection unit 1307 generates a look-up table, which stores the relationship between a third post-screen processing pixel value and the post-filtering difference data for each pixel based on a plurality of pieces of post-filtering difference data output from the filtering processing unit 1306. In addition, the selection unit 1307 selects an optimum provisional post-correction pixel value for each pixel and outputs post-correction reflectance data. The processing executed by the selection unit 1307 will be described in detail later below.

Figure 12:
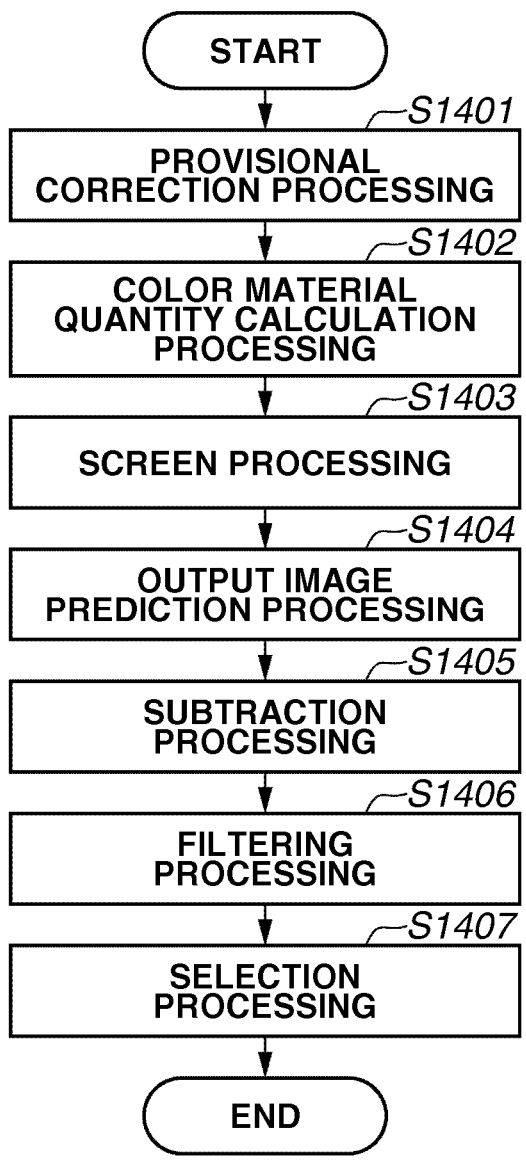
FIG. 12 is a flow chart illustrating an exemplary flow of image correction processing according to the second exemplary embodiment of the present invention.

FIG. 12 is a flowchart illustrating an exemplary flow of image correction processing executed by the provisional correction unit 1301 according to the present exemplary embodiment.

Referring to FIG. 12, in step S1401, the provisional correction unit 1301 executes provisional correction on the post-color conversion reflectance data C_k by using a plurality of different provisional correction amounts. More specifically, the provisional correction unit 1301 acquires nine pieces of post-provisional correction reflectance data C10_k, C11_k, C12_k, C13_k, C14_k, C15_k, C16_k, C17_k, and C18_k by using nine provisional correction amounts.

The provisional correction amount c is expressed by the real numbers of values ranging from −1 to 1. In addition, the same provisional correction amount c is used for all of the pixels.

In the present exemplary embodiment, the provisional post-correction pixel value $C10\_k(i, j)$ of an arbitrary pixel (i, j) can be expressed by the following expression (19):

$$C10\_k(i,j)=C\_k(i,j)+c \qquad (19).$$

In the present exemplary embodiment, nine values, such as −1, −0.3, −0.2, 0, 0.1, 0.2, 0.3, and 1, are used as the value of the provisional correction amount c.

Accordingly, the values of the post-provisional correction images C10_k, C11_k, C12_k, C13_k, C14_k, C15_k, C16_k, C17_k, and C18_k on the arbitrary pixel (i, j) are calculated by the following expressions (20) through (28):

$$C10\_k(i,j)=C\_k(i,j)-1 \qquad (20)$$

$$C11\_k(i,j)=C\_k(i,j)-0.3 \qquad (21)$$

$$C12\_k(i,j)=C\_k(i,j)-0.2 \qquad (22)$$

$$C13\_k(i,j)=C\_k(i,j)-0.1 \qquad (23)$$

$$C14\_k(i,j)=C\_k(i,j)+0 \qquad (24)$$

$$C15\_k(i,j)=C\_k(i,j)+0.1 \qquad (25)$$

$$C16\_k(i,j)=C\_k(i,j)+0.2 \qquad (26)$$

$$C17\_k(i,j)=C\_k(i,j)+0.3 \qquad (27)$$

$$C18\_k(i,j)=C\_k(i,j)+1 \qquad (28).$$

In the present exemplary embodiment, nine values, such as −1, −0.3, −0.2, 0, 0.1, 0.2, 0.3, and 1, are used as the value of the provisional correction amount c. However, the value of the provisional correction amount c is not limited to these values. For example, seven values, such as −1.0, −0.5, −0.25, 0, 0.25, 0.5, and 1.0, can be used as the value of the provisional correction amount c.

The optimum post-correction reflectance data is likely to be similar to image data whose provisional correction amount is around 0. Accordingly, values tightly around 0 can be used.

In other words, in setting the value of the provisional correction amount c, instead of evenly assigning the values in the range from −1 to 1, the stride between the provisional correction amounts can be made small in a range in which the provisional correction amount is close to 0, while the stride between the values of the provisional correction amount c can be made large in the other range.

In step S1402, the third color material quantity calculation unit 1302 converts the provisional post-correction reflectance data C10_k, C11_k, C12_k, C13_k, C14_k, C15_k, C16_k, C17_k, and C18_k into third color material quantity data.

The configuration of the third color material quantity calculation unit 1302 is the same as the first color material quantity calculation unit 107 used for calculating the color material quantity for the color of black. In the present exemplary embodiment, the conversion processing is executed by using the following expressions (29) through (37):

$$D10\_k = k\_LUT\_1D(C10\_k) \quad (29)$$

$$D11\_k = k\_LUT\_1D(C11\_k) \quad (30)$$

$$D12\_k = k\_LUT\_1D(C12\_k) \quad (31)$$

$$D13\_k = k\_LUT\_1D(C13\_k) \quad (32)$$

$$D14\_k = k\_LUT\_1D(C14\_k) \quad (33)$$

$$D15\_k = k\_LUT\_1D(C15\_k) \quad (34)$$

$$D16\_k = k\_LUT\_1D(C16\_k) \quad (35)$$

$$D17\_k = k\_LUT\_1D(C17\_k) \quad (36)$$

$$D18\_k = k\_LUT\_1D(C18\_k) \quad (37).$$

In step S1403, the third screen processing unit 1303 executes screen processing on the third color material quantity data D10_k, D11_k, D12_k, D13_k, D14_k, D15_k, D16_k, D17_k, and D18_k. Then, the third screen processing unit 1303 outputs third screen-processed data O10_k, O11_k, O12_k, O13_k, O14_k, O15_k, O16_k, O17_k, and O18_k. The configuration of the third screen processing unit 1303 is the same as the first screen processing unit 108 used for generating the screen-processed data for the color of black.

In step S1404, the output image prediction unit 1304 predicts the reflectance achieved when an image is printed on the recording medium and calculates predicted reflectance data C20_k, C21_k, C22_k, C23_k, C24_k, C25_k, C26_k, C27_k, and C28_k.

The configuration of the output image prediction unit 1304 is the same as the output image prediction unit 703 used for processing the second screen-processed data for the color of black.

In step S1405, the subtraction unit 1305 calculates the difference data E20_k, E21_k, and E28_k between the target post-color conversion reflectance data and the predicted reflectance by using the following expressions (38) through (46):

$$E20\_k = C20\_k - C\_k \quad (38)$$

$$E21\_k = C21\_k - C\_k \quad (39)$$

$$E22\_k = C22\_k - C\_k \quad (40)$$

$$E23\_k = C23\_k - C\_k \quad (41)$$

$$E24\_k = C24\_k - C\_k \quad (42)$$

$$E25\_k = C25\_k - C\_k \quad (43)$$

$$E26\_k = C26\_k - C\_k \quad (44)$$

$$E27\_k = C27\_k - C\_k \quad (45)$$

$$E28\_k = C28\_k - C\_k \quad (46).$$

In step S1406, the filtering processing unit 1306 executes filtering on the difference data and calculates post-filtering difference data E31_k, E31_k, . . . , E38_k by using the following expressions (47) through (55). In other words, the filtering is executed by using the following expressions (47) through (55):

$$E30\_k = E20\_k * F3 \quad (47)$$

$$E31\_k = E21\_k * F3 \quad (48)$$

$$E32\_k = E22\_k * F3 \quad (49)$$

$$E33\_k = E23\_k * F3 \quad (50)$$

$$E34\_k = E24\_k * F3 \quad (51)$$

$$E35\_k = E25\_k * F3 \quad (52)$$

$$E36\_k = E26\_k * F3 \quad (53)$$

$$E37\_k = E27\_k * F3 \quad (54)$$

$$E38\_k = E28\_k * F3 \quad (55).$$

Similar to the filter factor F used in the calculation that uses the expression (10), for a filter factor F3, a filter factor having the low-pass characteristic is used.

In step S1407, the selection unit 1307 selects the post-correction reflectance for each pixel achieved when the difference data becomes 0 based on the post-filtering difference data E30_k, E31_k, . . . , E38_k. Then, the selection unit 1307 outputs the post-correction reflectance data C1_k. The selection processing by the selection unit 1307 will be described in detail below.

In the selection processing according to the present exemplary embodiment, different processing is executed for each pixel (i, j). In the following description, the selection processing will be described in detail as to the case of two different pixel positions (i1, j1) and (i2, j2).

The post-filtering difference values for the pixel (i, j) are expressed as E30_k(i, j), E31_k(i, j), . . . , E38_k(i, j). In addition, the value of the post-correction image for the pixel (i, j) is expressed as C1_k(i, j).

To begin with, an exemplary method for calculating the post-correction reflectance data C1_k of the pixel (i1, j1) will be described in detail below.

Figure 13:
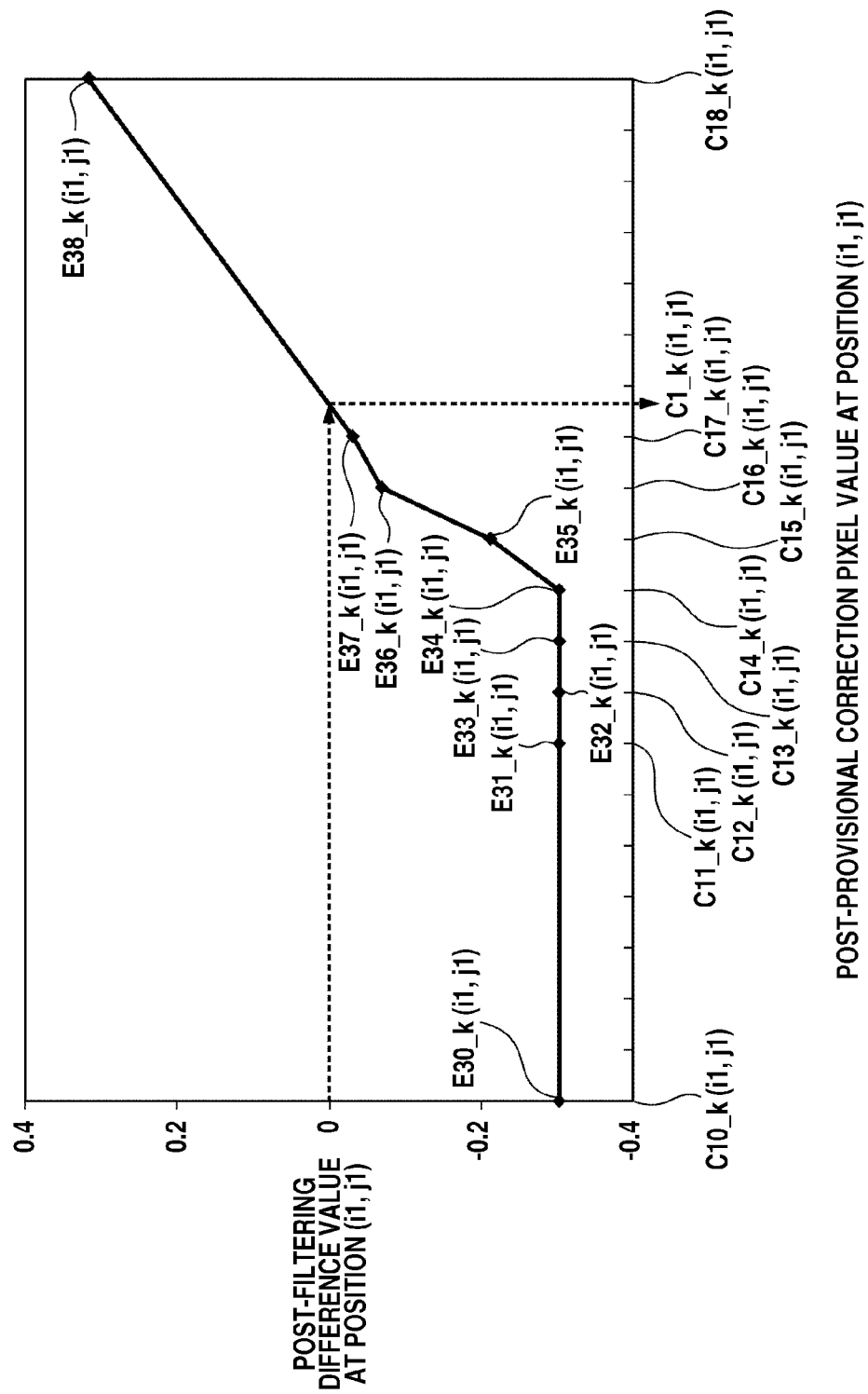
FIG. 13 is a graph illustrating a look-up table that stores a relationship between a value of a post-filtering difference image and a value of a provisional correction amount according to the second exemplary embodiment of the present invention.

FIG. 13 is a graph illustrating a look-up table that stores a relationship between the post-filtering difference value and the post-provisional correction reflectance for the pixel (i1, j1). Referring to FIG. 13, the post-filtering difference value is taken on the vertical axis. The third post-screen processing pixel value is taken on the horizontal axis.

The post-filtering difference values E30_k(i1, j1), E31_k (i1, j1), . . . , E38_k(i1, j1) correspond to the provisional post-correction reflectance C10_k(i1, j1), C11_k(i1, j1), . . . , C18_k(i1, j1), respectively.

The selection unit 1307 generates a large number of look-up tables described above for each pixel based on the result of the processing by the filtering processing unit 1306. For example, if an image of 1,000,000 pixels has been input, the selection unit 1307 generates 1,000,000 look-up tables. Furthermore, by referring to the reflectance for which the post-filtering difference value becomes 0 or the minimum value, the selection unit 1307 calculates optimum post-correction reflectance data C1_k(i1, j1).

In the example illustrated in FIG. 13, the reflectance for which the post-filtering difference data becomes 0 exists between C17_k(i1, j1) and C18_k(i1, j1). Accordingly, the post-correction reflectance C1_k(i1, j1) is calculated by an interpolation operation by using C17_k(i1, j1) and C18_k(i1, j1).

A method for calculating the post-correction reflectance data C1_k(i2, j2) on a pixel (i2, j2), which is similar to the method for calculating the post-correction reflectance data C1_k(i1, j1), will be described in detail below.

Figure 14:
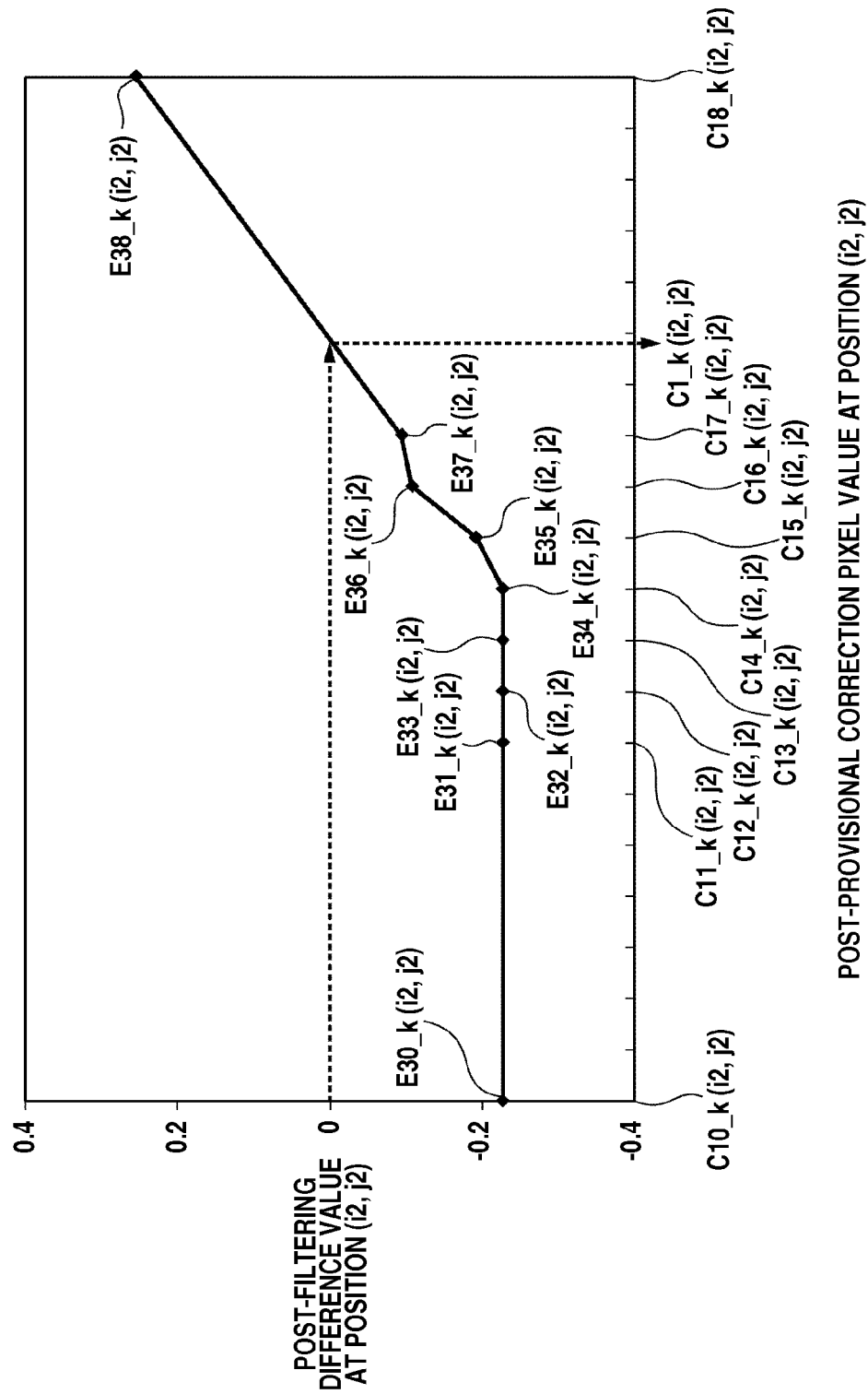
FIG. 14 is a graph illustrating a look-up table that stores a relationship between a value of a post-filtering difference image and a value of a provisional correction amount according to the second exemplary embodiment of the present invention.

FIG. 14 is a graph illustrating a look-up table that stores a relationship between the post-filtering difference value and the post-provisional correction reflectance for the pixel (i2, j2). The post-correction reflectance data C1_k(i2, j2) is calculated by calculating the reflectance for which the post-filtering difference value becomes 0 or the minimum value.

Referring to FIG. 14, the reflectance for which the post-filtering difference data becomes 0 exists between C17_k(i2, j2) and C18_k(i2, j2). Accordingly, the post-correction reflectance C1_k(i2, j2) is calculated by an interpolation operation by using C17_k(i2, j2) and C18_k(i2, j2).

In the description above, the present exemplary embodiment executes the method for calculating the post-correction reflectance data for two pixels (i1, j1) and (i2, j2). For the other pixels, the value of a post-correction image can be calculated by a similar method.

By executing the processing in the above-described manner, the entire processing executed by the image correction unit 106 is completed.

With the post-correction reflectance data C1_k calculated by the above-described processing, the post-color conversion reflectance data C_k can be reproduced on a recording medium with high accuracy because as described above, the post-correction reflectance data C1_k is calculated to control the difference between the predicted reflectance data and the target post-color conversion reflectance data at the value "0".

In the present exemplary embodiment, the post-correction reflectance data C1_k is calculated to control the data generated by filtering the difference at the value "0". The filtering is executed to remove unnecessary high-frequency components described above. Accordingly, if no such high frequency component may be generated, the filtering can be omitted.

Figure 16:
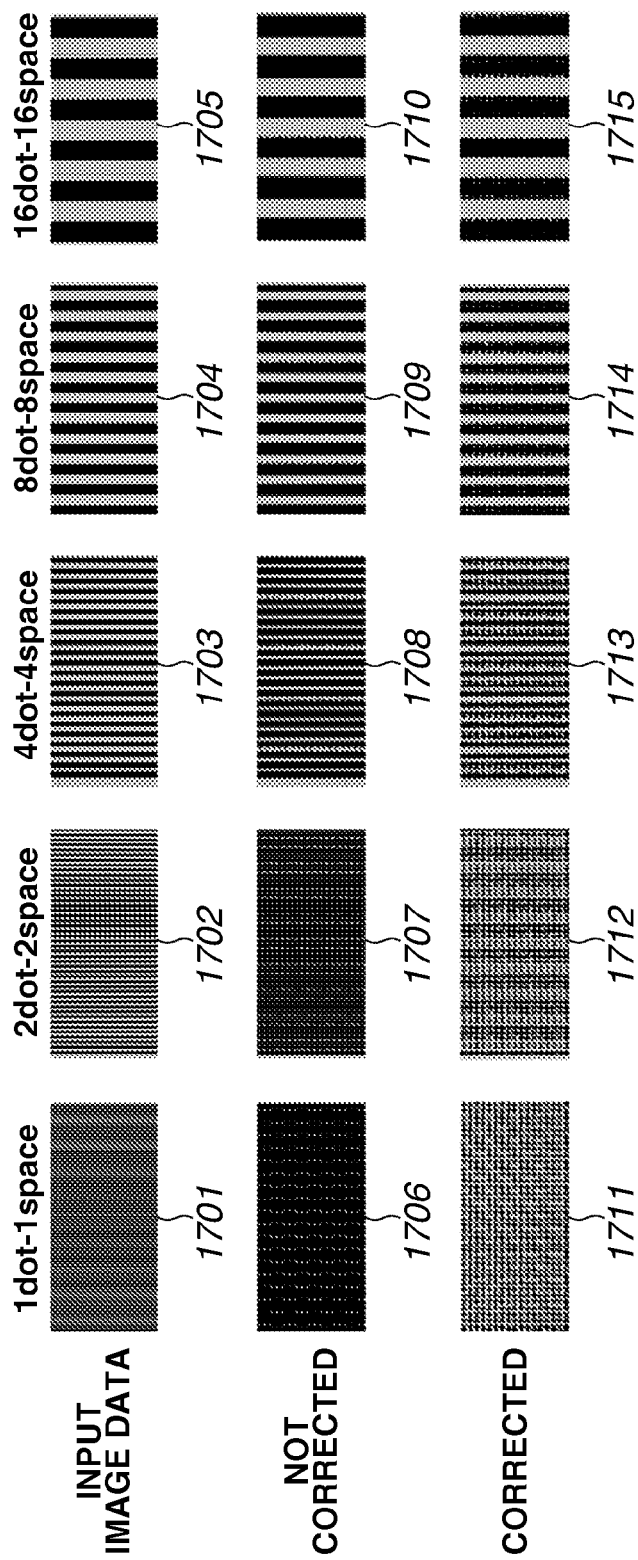
FIG. 16 illustrates an example of a processing result according to the second exemplary embodiment of the present invention.

FIG. 16 illustrates a simulation result of processing according to the present exemplary embodiment.

Referring to FIG. 16, image data 1701 through 1705 are input image data of single color of five types having different spatially frequencies. The input image data is data of a repeated pattern of vertical lines.

The input image data 1701 is a 1 dot-1 space repeated pattern. The input image data 1702 is a 2 dot-2 space repeated pattern. The color input image data 1703 is a 4 dot-4 space repeated pattern. The input image data 1704 is an 8 dot-8 space repeated pattern. The input image data 1705 is a 16 dot-16 space repeated pattern.

The average value of the reflectance of the above-described input image data was 0.42 according to a simulation experiment.

Image data 1706 through 1710 are output results of screen processing of the input image data 1701 through 1705 without executing correction thereon. The average value of the reflectance of the output results was substantially identical with the target reflectance average value "0.42" if the spatial frequency of the input image data was low. However, when the spatial frequency of the input image data was high, the average value of the output results became far lower than the target reflectance average value "0.42".

More specifically, the following average values of the reflectance were obtained:

Image data 1706: 0.09
Image data 1707: 0.20
Image data 1708: 0.31
Image data 1709: 0.37
Image data 1710: 0.39.

In other words, if correction is not executed, the reflectance may be different from the target reflectance of a high-spatial frequency image.

On the other hand, post-correction image data 1711 through 1715 are output results of the correction according to the present exemplary embodiment on the input image data 1701 through 1705. The following average values of the reflectance of the image data were obtained as a result of a simulation experiment:

Post-correction image data 1711: 0.43
Post-correction image data 1712: 0.42
Post-correction image data 1713: 0.39
Post-correction image data 1714: 0.40
Post-correction image data 1715: 0.41.

In other words, by executing the correction according to the present exemplary embodiment, the phenomenon of deviation of the reflectance from the target reflectance, which may occur on a high-spatial frequency image, can be prevented.

In the above-described exemplary embodiments of the present invention, the image forming apparatus 102 employs the electrophotographic method. However, the inkjet printing method can be used instead.

Figure 15:
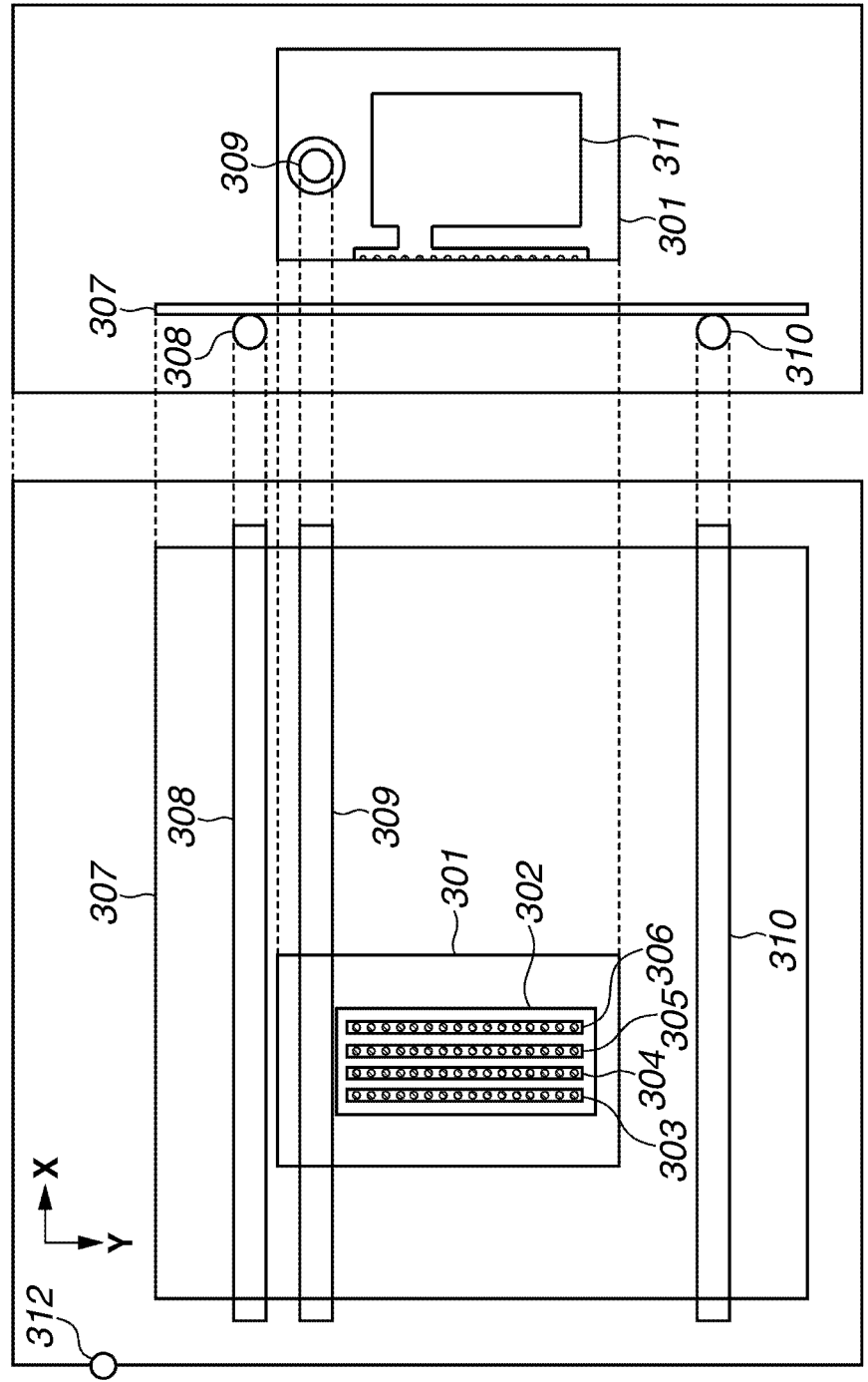
FIG. 15 is a block diagram illustrating an exemplary configuration of an inkjet type image forming apparatus according to a modification of the present invention.

Now, a modification of the exemplary embodiment of the present invention will be described below. FIG. 15 is a block diagram illustrating an exemplary configuration of an inkjet type image forming apparatus according to the modification of the present invention.

Referring to FIG. 15, a carriage 301 includes a recording head 302. The recording head 302 includes the recording element arrays 303, 304, 305, and 306, which discharge a C ink, an M ink, a Y ink, and a K ink, respectively.

The carriage 301 is supported by a guide rail 309. In addition, the carriage 301 is moved by a main scanning motor (not illustrated) in the X-direction (i.e., in the main scanning direction). A recording medium 307 is moved by a sub scanning motor (not illustrated) in the Y-direction (i.e., the sub scanning direction) via a sub scanning roller 308 and the paper discharge roller 310.

The recording element arrays 303, 304, 305, and 306 discharge the ink at the timing of scanning the recording medium 307 based on the image data input via an input terminal 312. The input terminal 312 corresponds to the input terminal 111 illustrated in FIG. 1.

With the above-described configuration, the modification of the embodiments of the present invention can print the image data output from the image processing apparatus 101. If the inkjet type printing method is executed, the ink is discharged from the recording element arrays 303 through 306 when the carriage 301 moves in the X-direction at a high speed. Accordingly, the ink may spread more easily in the X-direction than in the Y-direction on the recording medium.

In this case, for the filter factor F1, an anisotropic filter factor, such as the filter factor 1102 illustrated in FIG. 9, is appropriate. Accordingly, if the image forming apparatus 102 employs the inkjet printing method, the output image prediction unit 703 can use the filter factor 1102.

For the other configurations, the modification can employ the same configuration as the first exemplary embodiment or the second exemplary embodiment.

As described above in the exemplary embodiments and the modification of the present invention, an image processing apparatus is configured to convert input image data into halftone image data by executing halftone processing thereon. The image processing apparatus includes a prediction unit configured to predict a density of a pixel of interest, which is achieved when the halftone image data is printed, based on a group of halftone-processed pixels neighboring the pixel of interest according to a prediction method determined according to a halftone-processed pixel value of the pixel of interest, and a control unit configured to control the halftone processing according to the density predicted by the prediction unit.

The prediction unit is equivalent to the output image prediction unit 703 and the output image prediction unit 1304 according to the exemplary embodiments described above. Each image prediction unit stores the table corresponding to each pixel value as the prediction method determined according to a pixel value of the halftone-processed pixel of interest. However, it is not always necessary to store a table corresponding to the pixel value of the halftone-processed pixels as the configuration.

For example, if the pixel of interest is a black pixel, the pixel of interest is not likely to be subjected to an influence from the pixel group neighboring the pixel of interest. Accordingly, a method in which the prediction unit does not predict the density after actual printing can be used.

In this case, if the pixel of interest is a white pixel only, the prediction unit predicts the density according to a table corresponding to the white pixel. Instead of using the table, the density can be predicted by calculation.

In the method described above in the exemplary embodiments and the modification, the difference between the data generated by predicting the recorded color characteristic of an output image after a halftone-processed image is actually printed and the input image data is appropriately detected. In addition, the input image data is corrected according to the difference. To paraphrase this, the image correction unit 106 configured to correct input image data is used as the control unit.

However, the method for implementing a high quality output image is not limited to this. For example, a halftone-processed image can be corrected according to a difference detected by the method according to the above-described exemplary embodiment or the modification.

In addition, the difference can be referred to as an evaluation value. In this case, the screen processing can be switched in processing a pixel whose difference is large. In other words, the present invention can be implemented with a configuration with which a high quality image can be output by correcting the image data by using the difference between prediction data of the recorded color characteristic of an image after actual printing, which is calculated by the above-described exemplary embodiments and the modification, and the input image data.

The color conversion processing unit 105 according to the above-described exemplary embodiment and the modification outputs the data that describes the reflectance. However, the recorded color characteristic is not limited to the reflectance. In other words, the recorded color characteristic can be a recorded color characteristic different from the reflectance, such as the brightness or the density.

In this case, the color material quantity calculation unit, such as the first color material quantity calculation unit 107, can calculate the color material quantity based on the brightness or the density.

In addition, in this case, the output image prediction unit outputs the predicted value, such as the brightness or the density, based on the screen-processed data. To paraphrase this, in the above-described exemplary embodiments and the modification, various types of image processing are executed by using the reflectance as the target recorded color characteristic. However, the target recorded color characteristic can be a recorded color characteristic different from the reflectance, such as the brightness or the density.

The color material quantity calculation unit is not a component always required in implementing the present invention. In other words, if another configuration does not include the color material quantity calculation unit, the configuration is included within the scope of the present invention.

In addition, the processing executed by the screen processing unit in the above-described exemplary embodiment and the modification is not limited to the screen processing executed by the comparison with the threshold value table. For example, halftone processing, such as error diffusion, can be used.

Furthermore, the halftone processing can be switched according to the region of the input image. More specifically, AM screen processing with high screen ruling can be executed on a region of thin lines or edges, while on the other regions, AM screen processing with low screen ruling can be executed.

In addition, the format of the data output from the screen processing unit is not limited to binary data expressed by the value "0" or "1". In other words, quaternary data expressed by "0", "1", "2", or "3" can be used. To paraphrase this, any format of the data output from the screen processing unit that can be output from the image forming apparatus 102 can be employed.

Moreover, in the above-described exemplary embodiments and the modification, the filtering unit 705 and the filtering processing unit 1306 use the filter factor calculated by using the expression (18). However, a filter factor different from the above-described filter factor can be used. In addition, the filter factor can be switched according to the characteristic of the region of the input image.

More specifically, a filter factor having a high cutoff frequency can be used for processing a region of thin lines or edges while on the other regions, a filter factor having a low cutoff frequency can be used.

The filtering processing unit 705 and the filtering processing unit 1306 are not components always required to implement the present invention. Accordingly, if another configuration includes neither the filtering processing unit 705 nor the filtering processing unit 1306, the configuration is included within the scope of the present invention.

In addition, the configuration of the output image prediction unit according to the above-described exemplary embodiments and the modification is not limited to the configuration described above in the first exemplary embodiment and the second exemplary embodiment.

The output image prediction unit is directed to predicting the recorded color characteristic reproduced by the image forming apparatus 102 on the recording medium. Accordingly, any other configuration capable of predicting the recorded color characteristic can be used as the configuration of the output image prediction unit.

Moreover, in predicting the recorded color characteristic of an output image, the variation of the image forming apparatus 102 can be considered. For example, a phenomenon of the density of an image printed by the image forming apparatus 102 varying according to the progress of time can be simulated. Similarly, a phenomenon of inner-surface unevenness (banding) of an image printed by the image forming apparatus 102 can be simulated.

In addition, a signal from a sensor provided in the image forming apparatus 102 can be used in predicting the recorded color characteristic of an output image. For example, in the case of the electrophotographic printing type image forming apparatus 102 illustrated in FIG. 1, the image forming apparatus 102 can detect the rotation speed of the photosensitive drums 201 through 204 to predict the banding.

As described above, in predicting the recorded color characteristic of an output image, if the variation of the image forming apparatus 102 is considered, a possible degradation of image quality, which may arise due to the variation of the image forming apparatus 102, can be predicted. With the above-described configuration, the image quality degradation, which may arise due to the variation of the image forming apparatus 102, can be suppressed or reduced as well as preventing the excessive density of an input image having a high frequency component.

In addition, according to the above-described exemplary embodiments and the modification, the phenomenon of moire pattern, which may arise when AM screen processing is executed by the screen processing unit, such as the first screen processing unit 108, can be suppressed.

The phenomenon of moire pattern can be suppressed due to the following reasons. More specifically, a moire pattern occurring due to AM screen processing may appear on the predicted reflectance data output from the output image prediction unit. Because the input image is corrected based on the predicted reflectance data output from the output image prediction unit, the moire pattern occurring due to the AM screen processing is also corrected.

FIG. 17 illustrates a simulation result of processing for reducing the moire pattern that may arise due to AM screen processing.

Referring to FIG. 17, if screen processing is executed on input image data 1801 without executing the correction, image data 1802 is output. On the image data 1802, a moire pattern, which does not appear on the input image data 1801, exists.

On the other hand, post-correction image data 1803 is a printed image output when the image correction unit 106 according to the second exemplary embodiment has executed the correction. On the post-correction image data 1803, the moire pattern has been reduced.

Embodiments of the present invention can also be realized by a computer of a system or apparatus (or devices such as a CPU or micro-processing unit (MPU)) that reads out and executes a program of computer executable instructions recorded on a memory device to perform the functions of any of the above-described embodiment(s), and by a method, the steps of which are performed by a computer of a system or apparatus by, for example, reading out and executing the program recorded on a memory device to perform the functions of any of the above-described embodiment (s). For this purpose, the program may be provided to the computer for example via a network or from a recording medium of various types serving as the memory device (e.g., computer-readable medium). The program may be provided to the computer, for example, via a network or from a recording medium of various types serving as the memory device (e.g., computer-readable medium). The recording medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. Such a system or apparatus, and the computer-readable medium where the program is stored, are included as being within the scope of the present invention. The present invention can be implemented in a system, an apparatus, a method, a program, or a storage medium (recording medium) storing the program, for example. More specifically, the present invention can be applied to a system including a plurality of devices (a host computer, an interface device, an imaging apparatus, or a web application) and to an apparatus that includes such a device.

In addition, the functions according to the embodiments described above can be implemented not only by executing the program code read by the computer, but also implemented by the processing in which an operating system (OS) or the like carries out a part of or the whole of the actual processing based on an instruction given by the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-013915 filed Jan. 26, 2011, which is hereby incorporated by reference herein in its entirety.

What is claimed is:

1. An image processing apparatus, for an image forming apparatus printing an image, the image processing apparatus being for converting input image data into halftone image data by halftone-processing the input image data, the image processing apparatus comprising:
   a prediction unit configured to predict a density of a pixel of interest, wherein the density is achieved when an image according to the halftone image data is printed, based on a group of halftone-processed pixels neighboring the pixel of interest by using filtering; and
   a control unit configured to control the halftone processing according to the density predicted by the prediction unit,
   wherein the prediction unit, in case that a resolution of the image printed by the image forming apparatus is high, executes the filtering by a high filter factor, and
   wherein the prediction unit is configured to calculate an influence on a pixel value of the pixel of interest from the group of halftone-processed pixels neighboring the pixel on interest by using the filtering.

2. An image processing apparatus, for an image forming apparatus printing an image, the image processing apparatus being for converted input image data into halftone image data by halftone-processing the input image data, the image processing apparatus comprising:
   a prediction unit configured to predict a reflectance of a pixel of interest, wherein the reflectance is achieved when an image according to the halftone image data is printed, based on a group of halftone-processed pixels neighboring the pixel of interest by using filtering; and
   a control unit configured to control the halftone processing according to the reflectance predicted by the prediction unit,
   wherein the prediction unit, in case that a resolution of the image printed by the image forming apparatus is high, executes the filtering by a high filter factor, and
   wherein the prediction unit is configured to calculate an influence on a pixel value of the pixel of interest from the group of halftone-processed pixels neighboring the pixel of interest by using the filtering.

3. The image processing apparatus according to claim 1, wherein the control unit is configured to calculate a difference between the density by the prediction unit and a density of the input image data and to control the halftone processing according to the calculated difference.

4. The image processing apparatus according to claim 3, wherein the control unit is configured to detect a low frequency component of the difference and to control the halftone processing according to the low frequency component.

5. The image processing apparatus according to claim 1, wherein the control unit is configured to correct the input image data.

6. The image processing apparatus according to claim 1, wherein the control unit is configured to correct the halftone image data.

7. The image processing apparatus according to claim 1, wherein the control unit includes an evaluation unit configured to evaluate the halftone image data.

8. The image processing apparatus according to claim 1, wherein an anisotropic filter factor is used for the filtering.

9. The image processing apparatus according to claim 1, wherein the prediction unit is configured to predict the density according to whether a dot is recorded on the pixel of interest.

10. The image processing apparatus according to claim 9, wherein the prediction unit is configured to predict the density to control the influence from the group of pixels neighboring the pixel of interest to be higher when no dot is recorded on the pixel of interest than when a dot is recorded on the pixel of interest.

11. The image processing apparatus according to claim 1, wherein the halftone processing includes screen processing.

12. An image processing apparatus comprising:
a generation unit configured to generate a plurality of pieces of post-provisional correction data by processing input image data using a plurality of provisional correction amounts;
a first halftone processing unit configured to convert the plurality of pieces of post-provisional correction data into halftone image data;
a prediction unit configured to predict a density of a pixel of interest, wherein the density is achieved when the halftone image data is printed, based on a group of halftone-processed pixels neighboring the pixel of interest according to a prediction method determined according to a halftone-processed pixel value of the pixel of interest by using filtering;
a calculation unit configured to calculate post-correction data that satisfies a predetermined condition by comparing the density predicted by the prediction unit in the halftone image data with a density of the input image data; and
a second halftone processing unit configured to convert the post-correction data into halftone image data by executing processing similar to the halftone processing executed by the first halftone processing unit
wherein the prediction unit, in case that a resolution of the image printed by the image forming apparatus is high, executes the filtering by a high filter factor, and
wherein the prediction unit is configured to calculate an influence on a pixel value of the pixel of interest from the group of halftone-processed pixels neighboring the pixel of interest by using the filtering.

13. A method for controlling an image processing apparatus, for an image forming apparatus printing an image, the image processing apparatus being for converting input image data into halftone image data by halftone-processing the input image data, the image processing apparatus including a prediction unit and a control unit, the method comprising:
via the prediction unit, predicting a density of a pixel of interest, wherein the density is achieved when and image according to the halftone image data is printed, based on a group of halftone-processed pixels neighboring the pixel of interest by using filtering; and
via the control unit, controlling the halftone processing according to the predicted density,
wherein the prediction unit, in case that a resolution of the image printed by the image forming apparatus is high, executes the filtering by a high filter factor, and
wherein the prediction unit is configured to calculate an influence on a pixel value of the pixel of interest from the group of halftone-processed pixels neighboring the pixel of interest by using the filtering.

14. A non-transitory computer-readable storage medium storing a program of computer executable instructions for causing a computer to perform the method according to claim 13.

15. The image processing apparatus according to claim 1, wherein the prediction unit, in a case where the resolution of the image printed by the image forming apparatus is high, predicts the density of the pixel of interest based on a group of halftone-processed pixels including a halftone-processed pixel located more distant from the pixel of interest than in a case where the resolution of the image printed by the image forming apparatus is low.

16. The image processing apparatus according to claim 1, wherein the group of halftone-processed pixels corresponding to filtering in a case where the resolution of the image printed by the image forming apparatus is high includes a larger number of pixels than the group of halftone-processed pixels corresponding to filtering in a case where the resolution of the image printed by the image forming apparatus is low.

* * * * *